United States Patent [19]

Foster

[11] Patent Number: 5,315,916

[45] Date of Patent: May 31, 1994

[54] SYSTEM OF LINEAR HYDRAULIC MOTORS

[76] Inventor: Raymond K. Foster, P.O. Box 1, Madras, Oreg. 97741

[21] Appl. No.: 981,079

[22] Filed: Nov. 24, 1992

Related U.S. Application Data

[62] Division of Ser. No. 831,173, Feb. 5, 1992, Pat. No. 5,193,661.

[51] Int. Cl.⁵ .............................................. F01L 15/00
[52] U.S. Cl. ........................................ 91/178; 91/192; 91/536; 60/374
[58] Field of Search ...................... 91/176, 178, 189 R, 91/210, 419, 508, 525, 536, 191, 192; 60/369, 374, 420, 484; 92/66, 117 A, 117 R, 110

[56] References Cited

U.S. PATENT DOCUMENTS

| | | | |
|---|---|---|---|
| 2,382,023 | 8/1945 | Podesta | 60/374 X |
| 4,748,893 | 6/1988 | Foster | 91/176 |
| 4,748,894 | 6/1988 | Foster | 91/176 |
| 4,817,783 | 4/1989 | Foster | 91/189 R X |
| 4,821,868 | 4/1989 | Foster | 91/176 X |
| 4,969,387 | 11/1990 | Foster | 91/176 |

Primary Examiner—Edward K. Look
Assistant Examiner—F. Daniel Lopez
Attorney, Agent, or Firm—Joan H. Pauly

[57] ABSTRACT

The piston rods (10, 12, 14) of three linear hydraulic motors (M1, M2, M3) are stationary and include fluid pressure passageways (40, 52, 42, 54, 44, 56) which direct fluid pressure into and out from working chambers (16, 34, 18, 36, 20, 38) on opposite sides of piston heads (22, 24, 26). Movable cylinder barrels (16, 18, 20) are connected to a load, e.g. floor members (FM1, FM2, FM3) of a reciprocating floor conveyor (FIG. 18). The outer ends of the piston rods (10, 12, 14) include balls and the balls include ports (46, 58, 48, 60, 50, 62) through which fluid pressure is delivered or removed. Associated with each port is a limit valve LV1, LV2, LV3, LV4, LV5, LV6. Limit valves (LV1, LV2, LV3) are pushed into an open position by a retraction of the motors (M1, M2, M3). Limit valves (LV4, LV5, LV6) are pulled into an open position by extension of motors (M1, M2, M3). The limit valves (LV1, LV2, LV3, LV4, LV5, LV6) include springs biasing them into closed positions. The push and pull forces are in a direction opposite this spring force. Limit valves (LV1, LV2, LV3, LV4, LV5, LV6) are also opened by line pressure when flow is in a direction opposing the spring force. The system includes a two position switching valve (SV) controlled by a two position pilot valve (PV). The system operates to move the motors (M1, M2, M3) in unison, in a first direction, and to retract them sequentially. The system is reversible.

5 Claims, 19 Drawing Sheets

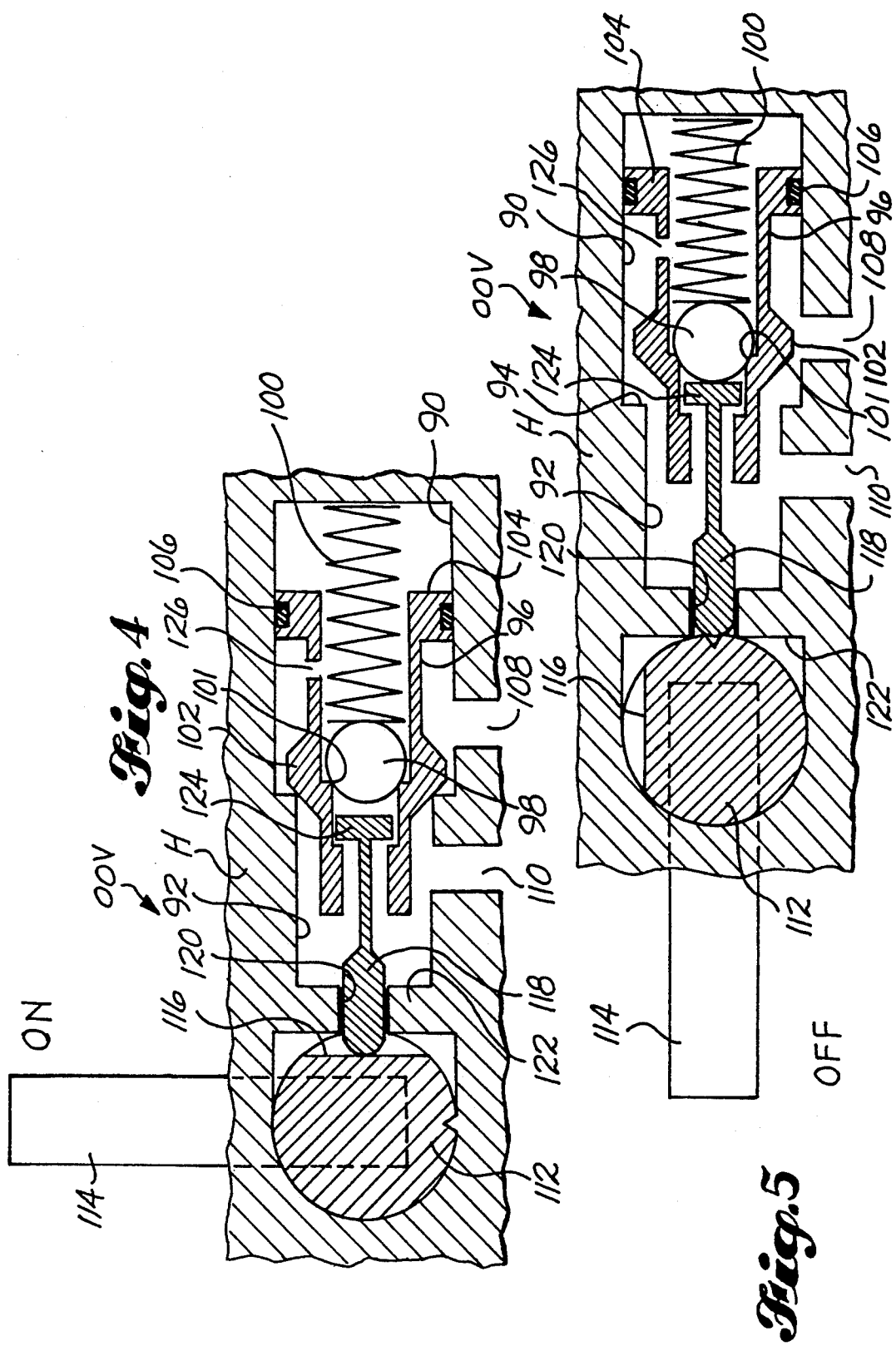

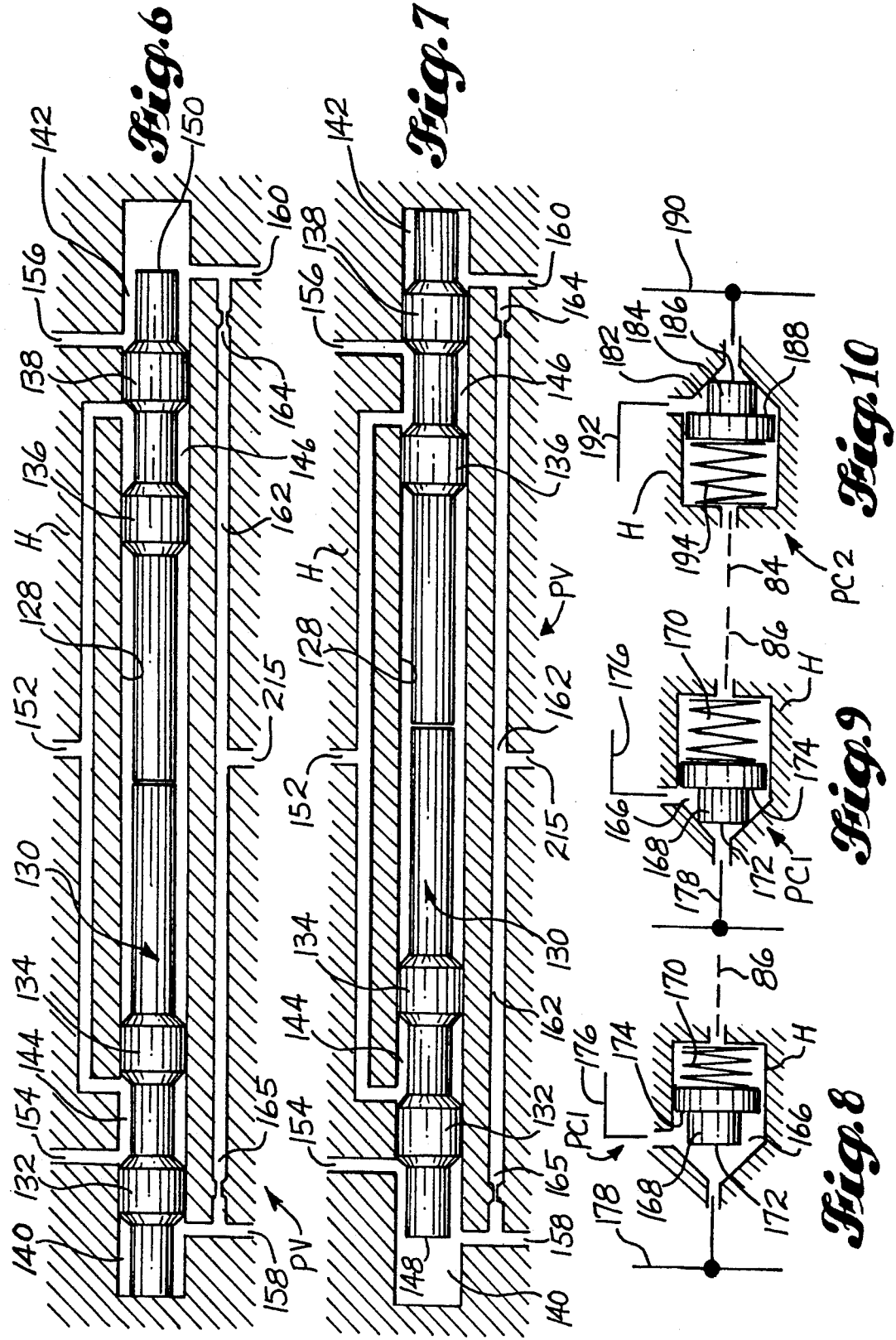

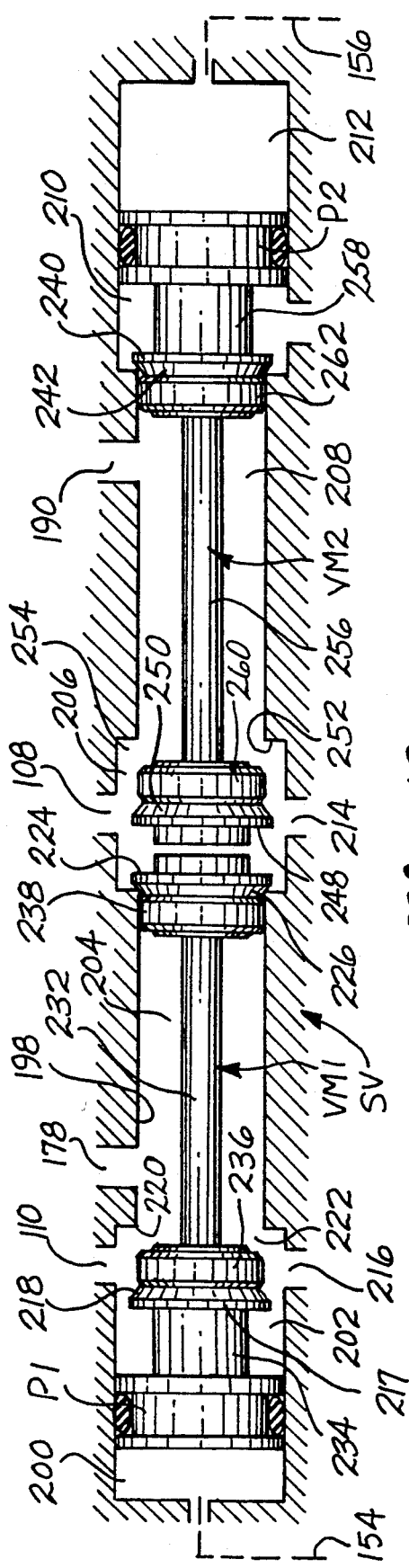
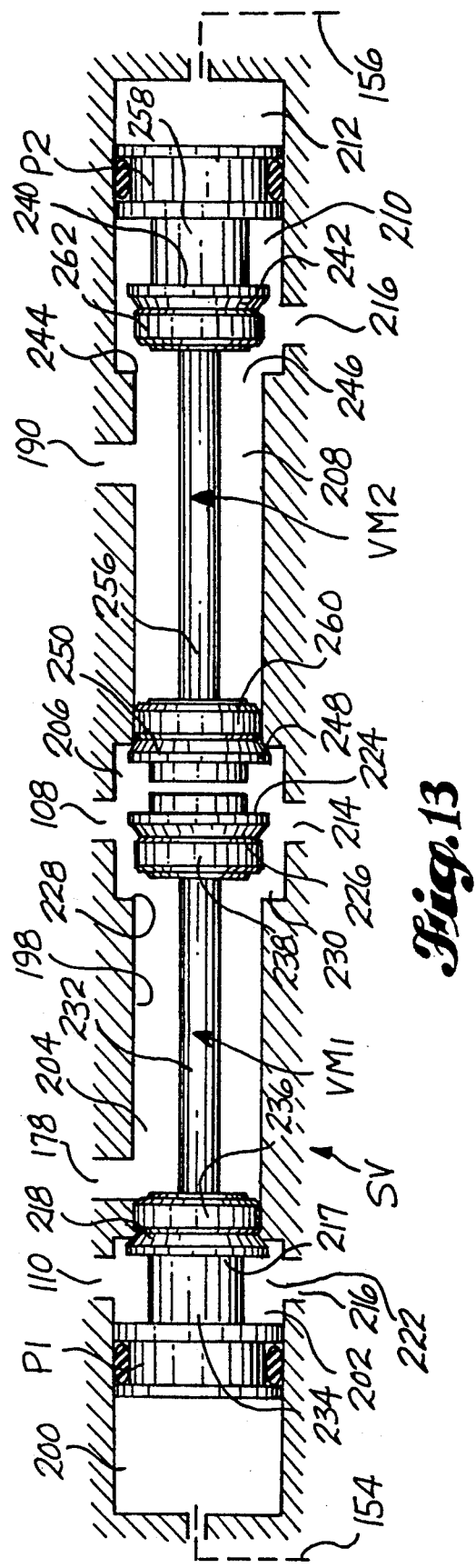
Fig. 12
Fig. 13

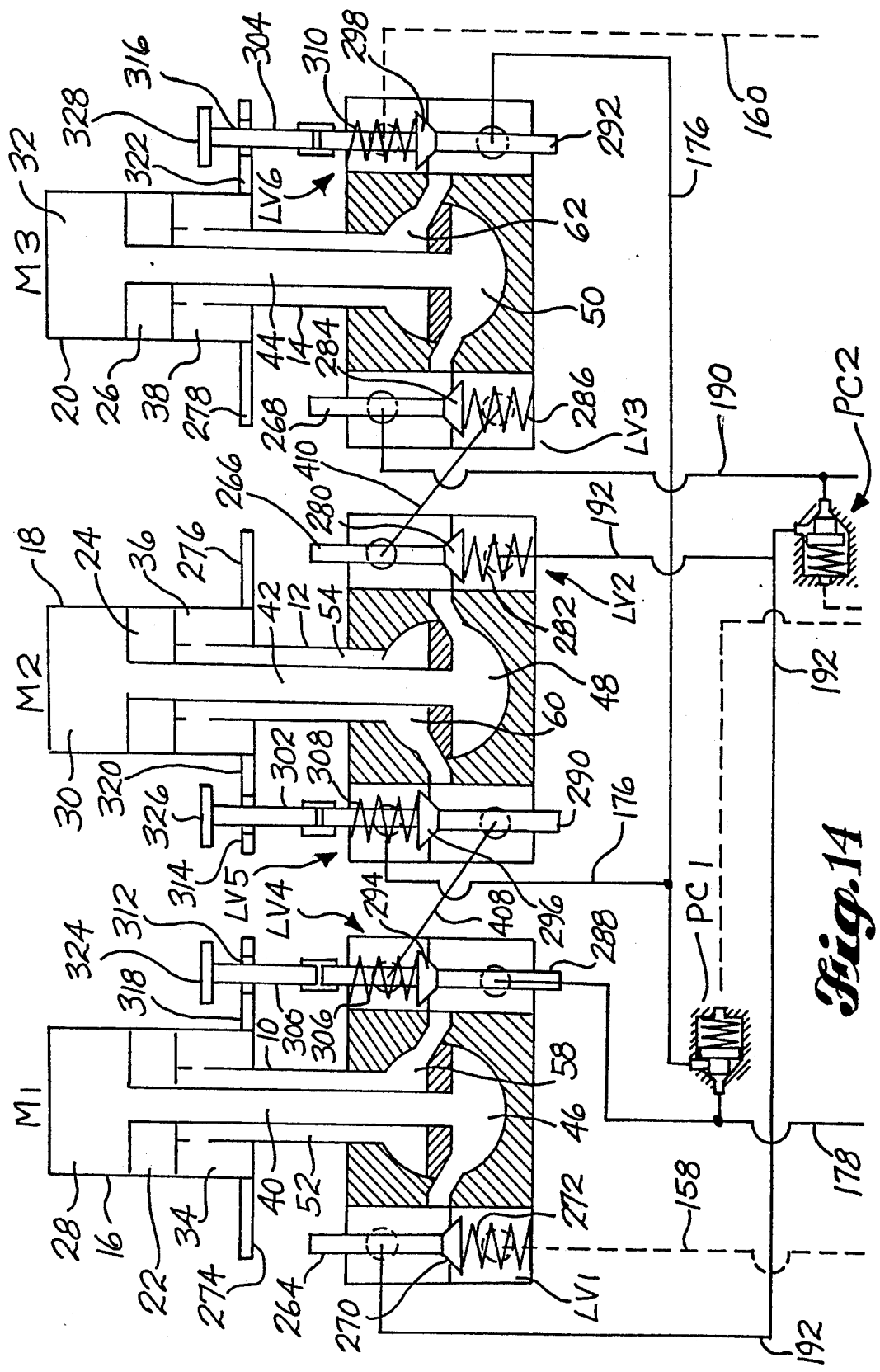

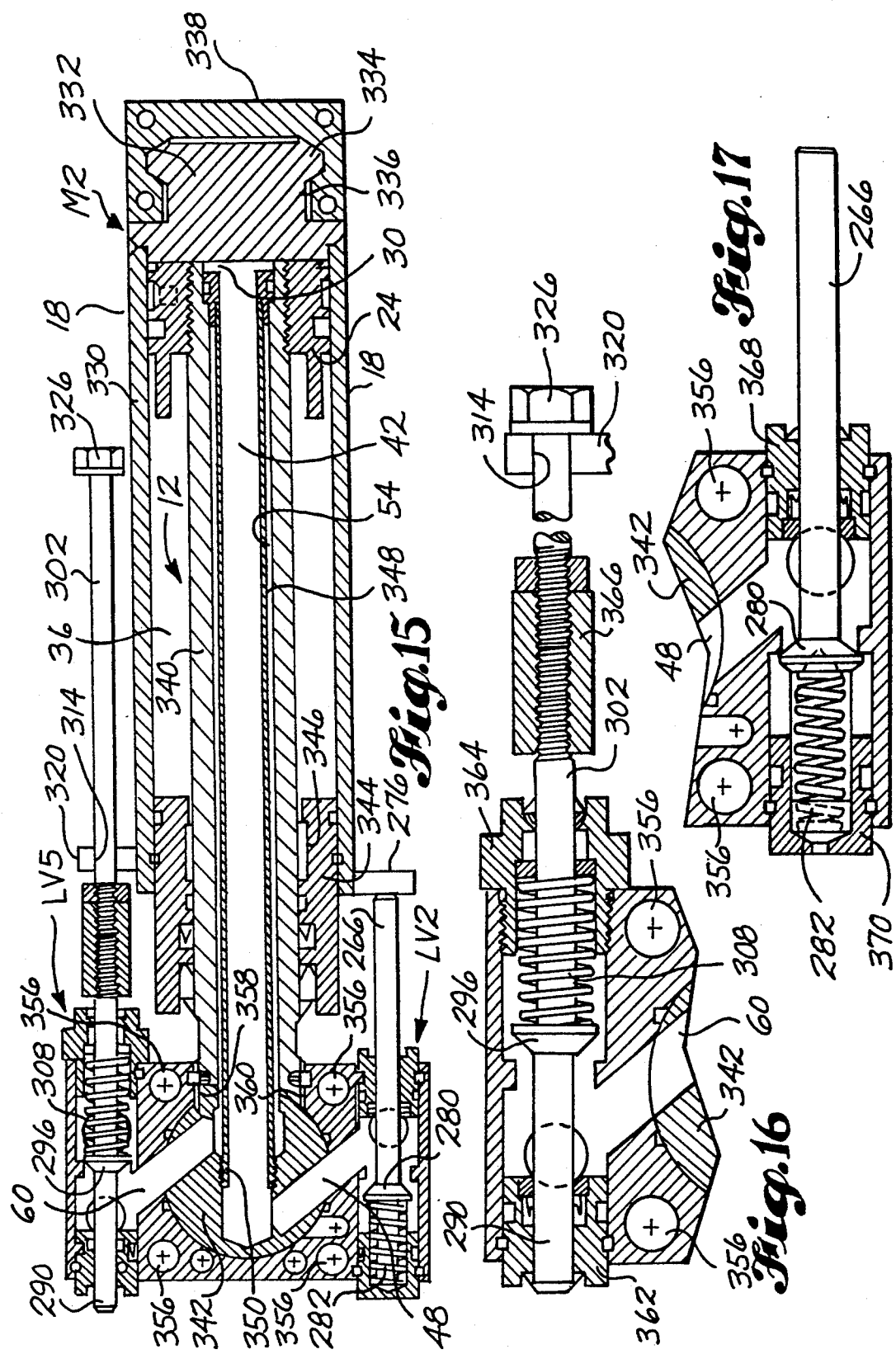

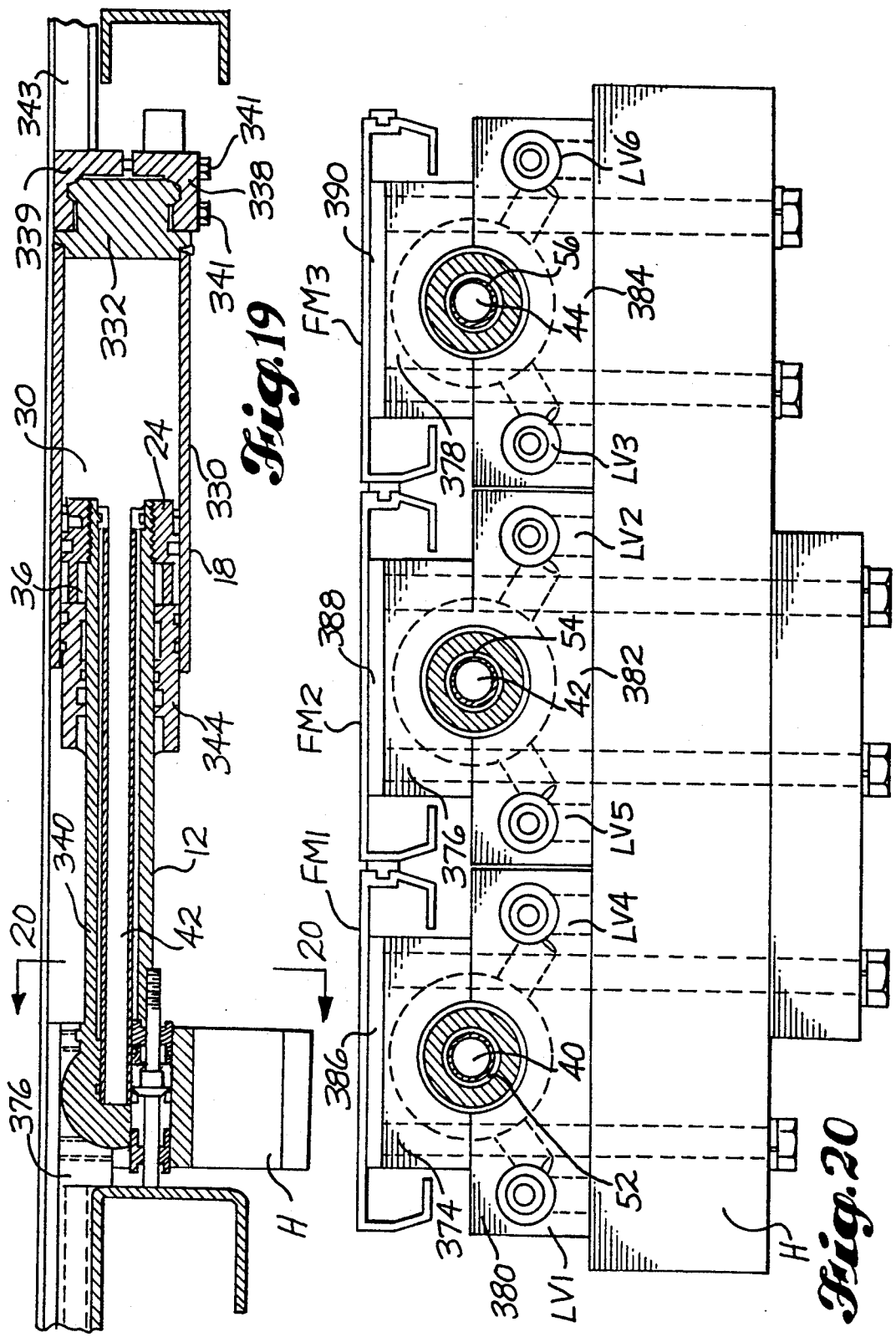

SYSTEM OF LINEAR HYDRAULIC MOTORS

This application is a division of application Ser. No. 07/831,173 filed Feb. 5, 1992 now U.S. Pat. No. 5,193,661.

TECHNICAL FIELD

This invention relates to a hydraulic drive system basically characterized by a plurality of linear hydraulic motors which are driven in unison, in one direction, and are retracted sequentially in the opposite direction. More particularly, the invention relates to the provision of a unique system for automatically controlling the fluid motors.

RELATED APPLICATION

The parent application (Ser. No. 07/831,173) of this application filed concurrently with my companion application Ser. No. 07/831,451, filed Feb. 5, 1992, and entitled Reciprocating Floor Conveyor, now U.S. Pat. No. 5,165,524. The contents of said companion application are hereby incorporated by reference into this application.

BACKGROUND OF THE INVENTION

U.S. Pat. No. 3,905,290, granted Sep. 16, 1975, to Robert A. Caughey, discloses a press which includes a reciprocating slat conveyor. The conveyor includes adjacent slat members which are in contact with the material to be conveyed. Linear hydraulic motors are used to move the slat members, in unison, in the conveying direction, and to move the floor members sequentially in the opposite direction. The control system for the linear hydraulic motors includes solenoid operated switching valves controlled by a rotary cam U.S. Pat. No. 3,146,678, granted Sep. 1, 1964, to Rudolf Paul Strick, discloses a system of three linear hydraulic motors which are moved in unison, in a first direction, and are moved sequentially in an opposite direction. The system utilizes a switching valve for switching hydraulic pressure and return between two conduits. The linear hydraulic motors include first and second working chambers on opposite sides of a piston head. The first conduit is connected to the first working chambers. The second conduit is connected to the second working chambers. The system includes sequence valves which function together to produce the desired movement of the motors.

The publication "Hydraulic Circuits And Control Systems", by J. R. Fawcett, published by the Trade And Technical Press Ltd, of Morden, Surrey England TJ843F35 (on pages 146 and 147) discloses an all hydraulic system for moving two or more linear fluid motors in unison, in a first direction, and moving them individually and in sequence, in the opposite direction. Circuit 75 includes a switching valve for switching hydraulic fluid pressure between two main conduits. One of the conduits extends to the first working chambers of the motors. The second conduit extends to the second working chambers of the motors. The system includes sequencing valves for effecting the sequential movement of the motors.

U.S. Pat. No. 4,143,760, granted Mar. 13, 1979, to Olof A. Hallstrom, discloses a reciprocating slat conveyor that is powered by hydraulic linear motors. The control system for the motors includes a switching valve that is biased into a first position by a spring and is moved into a second position by an air cylinder. Sequence valves in the form of internal check valves are provided in one of the conduits which is connected to the switching valve. This conduit extends in series through working chambers of the motors. Limit valves are provided to control the flow of air pressure into and out from the air cylinder which moves the switching valve.

Starting in about 1972, there has been a succession of reciprocating floor conveyor systems constructed which utilize two or more linear hydraulic motors for moving the conveyor slats in unison, in the conveying direction, and returning them one at a time back to a start position. Some of the control systems used included solenoid controlled valves and limit switches for energizing the solenoids. Other conveyor systems utilized a switching valve of the type disclosed by U.S. Pat. No. 3,530,895, granted Sep. 29, 1970, to Arthur A. Rothrock. Some of these systems combined with this switching valve internal check valves such as disclosed in U.S. Pat. No. 4,143,760. Others used sequence valves of the type disclosed in my aforementioned U.S. Pat. No. 4,748,893. Other systems utilized a switching valve of the type disclosed in my U.S. Pat. No. 5,103,866, in combination with sequence valves generally of the type disclosed in my aforementioned U.S. Pat. No. 4,748,893.

There is a need for an all hydraulic control system for moving a plurality of linear hydraulic motors in unison, in a first direction, and moving them sequentially in the opposite direction, which utilizes a minimum of components and conduits which must be assembled and disassembled and which is reliable in operation and has a substantial use life. A principal object of the present invention is to provide a unique control system which meets these objectives.

DISCLOSURE OF THE INVENTION

A system of the invention includes three linear hydraulic motors. Each hydraulic motor includes a stationary portion and a movable portion. Together the stationary and movable portions define a first working chamber on a first side of the piston head and a second working chamber on a second side of the piston head. A control system moves hydraulic fluid pressure into and out from the working chambers, to move the movable portions of the motors in unison, in a first direction, and to move them sequentially in the opposite direction. The control system includes a two position switching valve which is controlled by a two position pilot valve. The switching valve includes a first end, a first pilot chamber at said first end, a second end and a second pilot chamber at said second end. Movement of the pilot valve from one of its positions to the other switches hydraulic pressure and return between the first and second pilot chambers of the switching valve. Movement of the switching valve from of its positions to the other switches hydraulic pressure and return between a first passageway leading to the first working chambers of the linear hydraulic motors and a second passageway leading to the second working chambers of the motors. The system includes first and second limit valves associated with the linear hydraulic motors, for switching hydraulic pressure and return between the first and second pilot chambers of the pilot valve. The first limit valve is associated with the first hydraulic linear motor to move in sequence. It is mechanically opened when the movable portion of its motor substantially reaches an end-of-movement position. The second limit valve is associated with the third motor to move in the sequence. It is mechanically opened when the third motor substantially reaches an opposite end-of-movement position. One of the limit switches is pushed open. The other is pulled open.

In preferred form, the pilot valve includes a valve spool having a first end located in the first pilot chamber of the pilot valve. It also includes a second end located in the second pilot chamber of the pilot valve. A first pilot passageway is connected at one of its ends to the first pilot chamber of the pilot valve and is connected at its opposite end to the first limit valve. A second pilot passageway is connected at one of its ends to the second pilot chamber in the pilot valve and at its opposite end to said second limit valve. The two limit valves are normally closed but one is opened by contact at the end of travel of its motor in one direction. The other is opened by contact at the end of travel of its motor in the opposite direction. A pressure supply passageway interconnects the two pilot passageways. The pressure supply passageway includes a pair of spaced apart restrictions. A pressure delivery passageway is connected to the pressure supply passageway, between the two restrictions. The supply passageway communicates hydraulic pressure from said delivery passageway with both pilot chambers of the pilot valve, via the two restrictions. The opening of a said limit valve will connect the associated pilot chamber with return. This creates a pressure differential which shifts the valve spool of the pilot valve towards the vented pilot chamber.

In preferred form, the switching valve includes first and second valve members. Each valve member has a first end and a second end. The second ends of the valve members are located in a pressure chamber. A pressure source passageway delivers pressure into the pressure chamber to act on the second ends of the two valve members. The first end of the first valve member is directed into a first pilot chamber for the switching valve. The second valve member has a first end directed into a second pilot chamber for the switching valve. The first ends of the valve members are larger in area than the second ends of the valve members. The system includes a passageway leading to the pilot valve to the first pilot chamber of the switching valve. It also includes a second passageway leading from the pilot valve to the second pilot chamber of the switching valve. Pilot valve operation switches pressure and return between these two passageways and hence between the two pilot chambers of the switching valve. When the first pilot chamber of the switching valve is connected to return by the pilot valve, pressure in the pressure chamber acting on the second end of the first valve member moves the first valve member towards the first pilot chamber. The simultaneous connection of the second pilot chamber of the switching valve to pressure, also by the pilot valve, results in a force differential between the two ends of the second valve member. This is because of the area difference between the two ends of the second valve member. The force differential shifts the second valve member towards the pressure chamber and away from the second pilot chamber of the switching valve. This movement of the two valve members places the switching valve into one of its two positions.

In one embodiment the system operates in the manner described in one direction only. In other words, the linear hydraulic motors are moved in unison in one direction, and are moved sequentially in an opposite direction. In a second embodiment, the mode of movement is reversible. That is, the linear hydraulic motors can be moved in sequence in the first direction and moved in unison in the opposite direction. Such embodiment includes a direction control valve and pilot controlled check valve means.

According to an aspect of the invention, each linear hydraulic motor includes a first port associated with its first working chamber and a second port associated with its second working chamber. A first limit valve is associated with the first port and a second limit valve is associated with the second port. The first limit valve comprises a housing divided into first and second chambers by a wall which includes a valve orifice. The first port of the linear hydraulic motor is connected to the first chamber. The first chamber includes a second inlet/outlet port. The second chamber includes an inlet/outlet port. A valve plug is located in the second chamber and is backed by a compression spring in the second chamber, urging it towards the valve orifice. A control rod extends from the valve plug to the first chamber and out from the first chamber towards the movable portion of the linear hydraulic motor. The second linear valve includes a housing divided into first and second chambers by a divider wall which includes a valve orifice. The second port of the motor is connected to the first chamber of the second limit valve. The first chamber of the second limit valve also includes an inlet/outlet port. A valve plug is located in the second chamber of the second limit Valve. This valve plug is backed by a compression spring that is located in the second chamber of the second limit valve. A control rod extends from the valve plug through the second chamber and out from said chamber to the movable portion of the linear hydraulic motor. This control rod is engaged by the movable portion of the motor and is pulled into an open position against the force of the second spring, when the movable portion of the linear hydraulic motor substantially reaches the end of travel in its second direction of travel, and wherein the second chamber of the second limit valve includes an inlet/outlet port.

According to an aspect of the invention, and on/off valve is provided which is movable between an "on" and an "off" position. When this valve is in its "on" position, it is closed and it blocks flow from pressure chamber of the switching valve back to tank. When the valve is moved into its "off" position, it opens and vents the pressure chamber in the switching valve back to the tank. This renders the switching valve inoperable and stops the system, even though the pump is still pumping hydraulic fluid.

An aspect of the invention claimed in my above-cited U.S. Pat. No. 5,193,661 is to use the system of the invention to power the floor members of a reciprocating floor conveyor. The movable portions of the motors are directly connected to at least two adjacent floor members (e.g. three side-by-side) floor-members of the conveyor. These floor members act as longitudinal beams for transmitting the drive force from the motors to the rest of the floor members. At a location spaced longitudinally of the conveyor from the three motors, three transverse drive beams extend across the conveyor. Each drive beam is connected to one of the floor members that is connected to a motor. It is also connected to the other floor members of the same set.

Other objects, features and advantages of the invention will be hereinafter description of the best mode.

BRIEF DESCRIPTION OF THE DRAWING

Like reference numerals are used to designate like parts throughout the several views of the drawing, and:

FIG. 4 is a longitudinal sectional view of an on/off valve, showing the valve in its "on" position;

FIG. 5 is a view like FIG. 15, but showing the on/off valve in its "off" position;

FIG. 6 is a longitudinal sectional view of a pilot valve, showing the valve spool in elevation, and showing the valve spool in a first of two positions;

FIG. 7 is a view like FIG. 6, but showing the valve spool in its second position;

FIG. 8 is a schematic diagram of a first pilot controlled check valve, shown in an open position;

FIG. 9 is a view like FIG. 8, but showing the valve in a closed position;

FIG. 10 is a view like FIGS. 8 and 9, but of a second pilot controlled check valve, such view showing the valve in a closed position;

FIG. 12 is a longitudinal sectional view of a pilot operated switching valve, showing two pilot controlled valve members in elevation and in a first position;

FIG. 13 is a view like FIG. 12, but showing the valve members in a second position;

FIG. 14 is an enlarged scale view of the fluid motors and associated sequence valves;

FIG. 15 is an enlarged scale longitudinal sectional view of one of the fluid motors;

FIG. 16 is a further enlarged scale view of a first sequence valve that is associated with the motor, such valve being shown in an open position;

FIG. 17 is an enlarge scale fragmentary view of a second sequence valve associated with the motor, such valve being shown in closed position;

FIG. 19 is a longitudinal sectional view taken substantially along line 19—19 of FIG. 20;

FIG. 20 is a cross sectional view taken substantially along line 20—20 of FIG. 19;

BEST MODE FOR CARRYING OUT THE INVENTION

Figure 1:
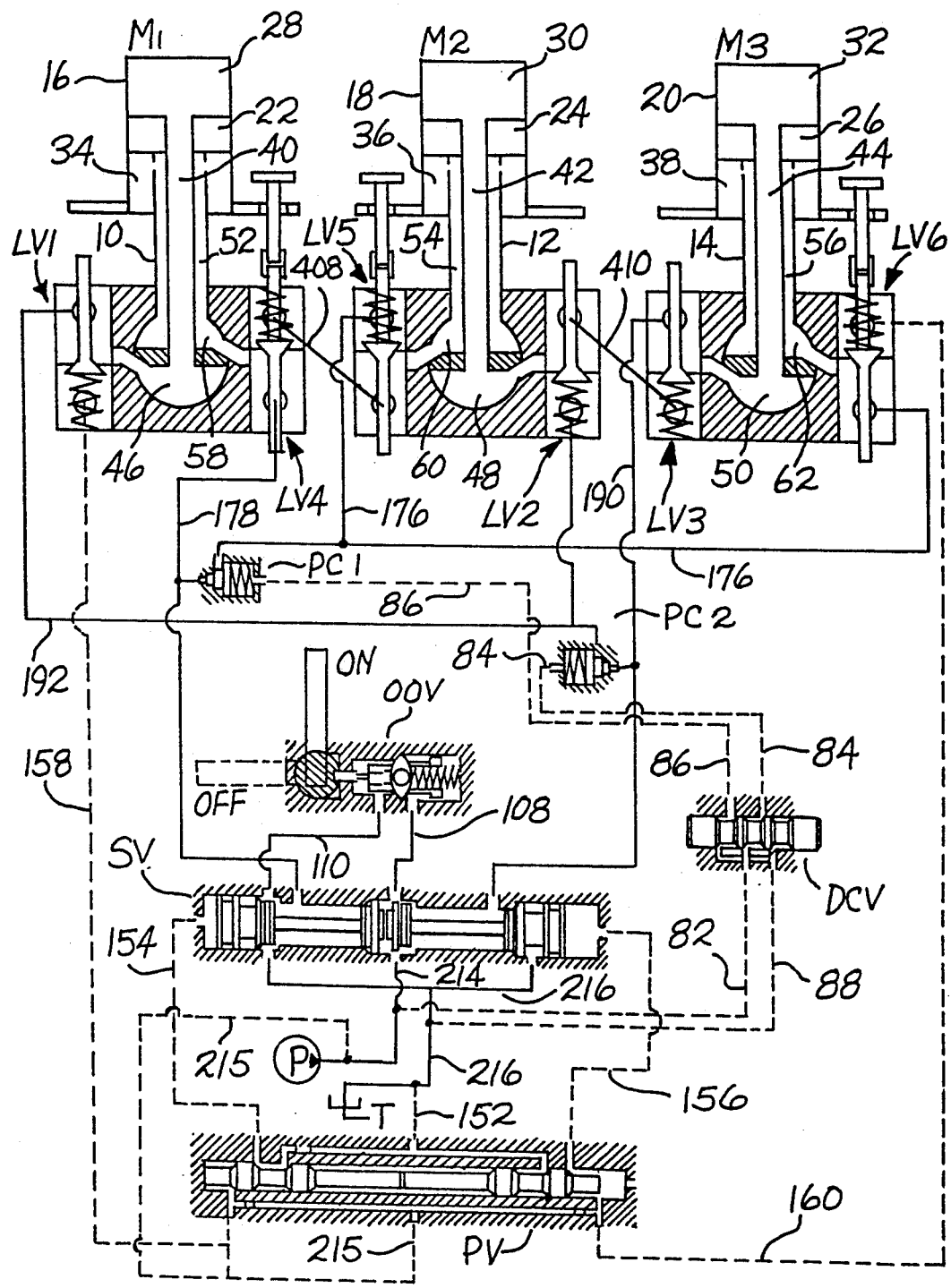
FIG. 1 is a schematic diagram of three linear hydraulic motors and a control system for automatically controlling hydraulic fluid pressure to and from the working chambers of the motors.

The disclosed embodiment includes three linear hydraulic motors M1, M2, M3. In preferred form, motors M1, M2, M3 are composed of stationary piston rods 10, 12, 14 and movable cylinder bodies 16, 18, 20. Piston rods 10, 12, 14 include piston heads 22, 24, 26 which are located inside of the cylinder bodies 16, 18, 20. Each piston head 22, 24, 26 divides its cylinder body 16, 18, 20 into two working chambers, one on each side of the piston head 22, 24, 26. In the drawing figures, the working chambers opposite the piston rods 10, 12, 14 are designated 28, 30, 32. The rod side working chambers are designated 34, 36, 38. In preferred form, the piston rods 10, 12, 14 include central passageways 40, 42, 44 through which hydraulic fluid is transmitted to and from working chambers 28, 30, 32. Piston rods 10, 12, 14 also include passageways 52, 54, 56 through which hydraulic fluid is transmitted to and from the working chambers 34, 36, 38. As clearly illustrated, the passageways 52, 54, 56 are annular and they surround the central passageways 40, 42, 44. Passageways 40, 42, 44 are connected to port regions 46, 48, 50. Passageways 52, 54, 56 are connected to port regions 58, 60, 62. Each of these port regions 46, 48, 50, 58, 60, 62 are connected to passageways in a control circuit.

As will hereinafter be described, the control circuit is interposed between a pump P, or other source of hydraulic fluid pressure, and a tank T. The control cirouit, when turned on, operates automatically to control movement of the motor's M1, M2, M3. The control system includes a direction control valve DCV which is a two positioned four-way switching valve. When the control system is on, and the three motors M1, M2, M3 are fully extended, and the direction control valve DCV is in its first position, the control system operates to connect the working chambers 34, 36, 38 with pressure and working chambers 28, 30, 32 with tank, T causing the motors M1, M2, M3 to retract in unison. Then, when all three motors M1, M2, M3 are retracted, the control system causes the three motors M1, M2, M3 to extend one at a time, starting with motor M1, then motor M2 and finally motor M3. Movement of directional control valve DCV into its second position will cause the control system to extend all three motors M1, M2, M3, in unison, and then retract them one at a time, starting with motor M3.

Figure 2:
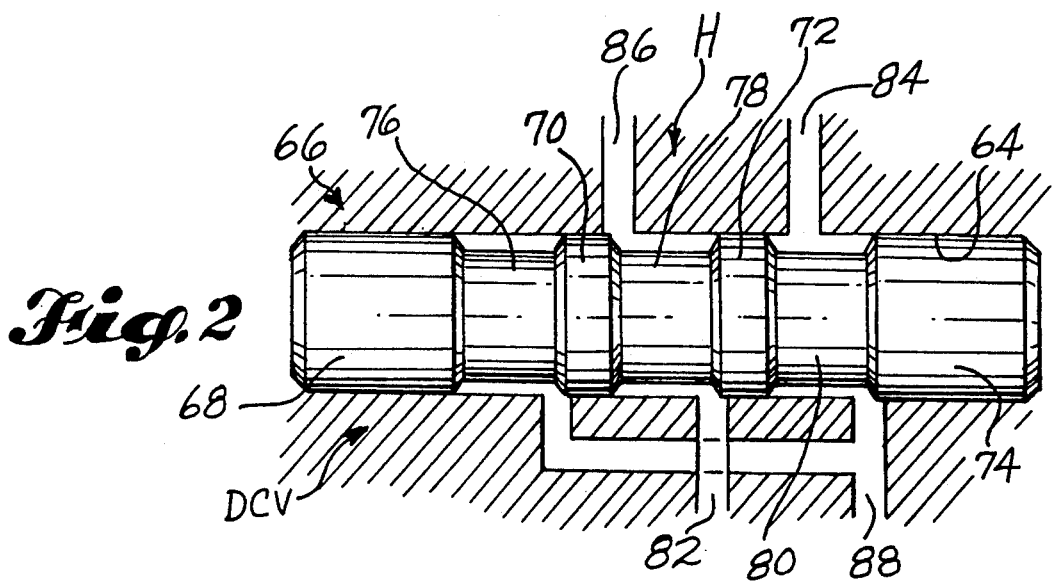
FIG. 2 is a longitudinal sectional view of a reversing valve, showing a valve spool in elevation and in a first position.
Figure 3:
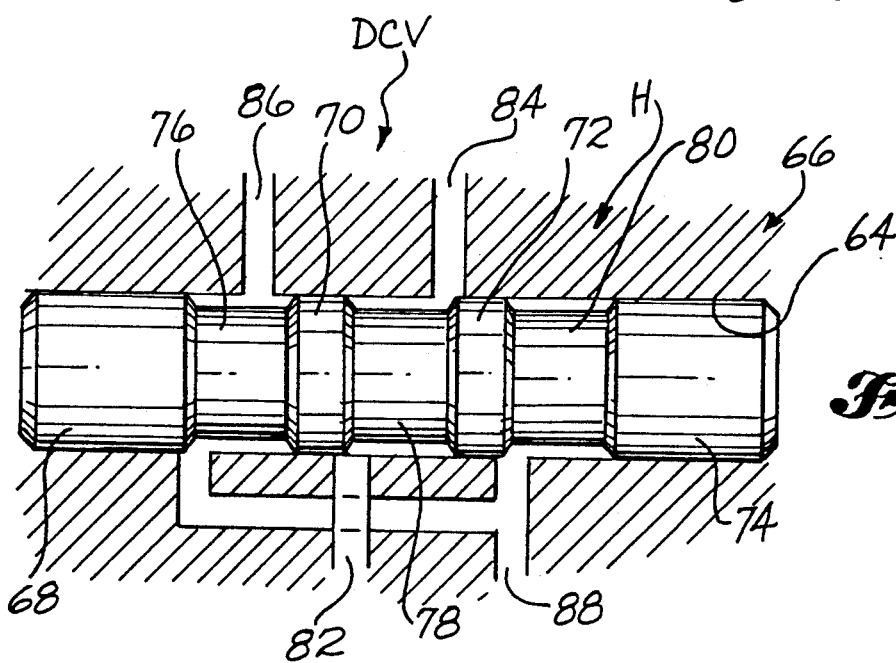
FIG. 3 is a view like FIG. 2, but showing the valve spool in a second position.

The direction control valve DCV can be any suitable switching valve capable of switching hydraulic pressure and return between two pilot passageways. The illustrated directional control valve DCV will now be described, with reference to FIGS. 2 and 3. Valve DCV includes a housing in which a valve spool cavity is formed. In FIGS. 2 and 3 the housing is designated H and the valve spool cavity is designated 64. The valve spool is designated 66. Valve spool 66 is composed of a series of lands 68, 70, 72, 74. A first grooved region 76 is formed between lands 68, 70. A second grooved region 78 is formed between lands 70, 72. A third grooved region 80 is formed between lands 72, 74. When valve spool 66 is in the position shown by FIG. 2, pressure passageway 82 is connected with pilot passageway 86 via groove 78 and pilot passageway 84 is connected with return passageway 88 via groove 80. When valve spool 66 is in the position shown by FIG. 3, the pressure passageway 82 is connected with pilot passageway 84 via groove 78 and pilot passageway 86 is connected with return passageway 88 via groove 76.

The illustrated on/off valve OOV will now be described with reference to FIGS. 4 and 5. Valve OOV includes a housing H in which a two part valve cavity 90, 92 is formed. Valve cavity portion 90 is larger in diameter than valve cavity portion 92. As a result, a shoulder is formed where the two cavities 90, 92 meet. The intersection of the shoulder with the sidewall of cavity 92 forms a valve seat 94 (FIG. 5). A tubular valve piston 96 is located in the valve cavity. Valve piston 96 includes a center cavity divided into three sections of different diameter. The largest diameter section houses a valve ball 98 and a compression spring 100. Compression spring 100 normally biases valve ball 98 against a valve seat 101 formed where the large diameter section of the cavity meets an intermediate diameter section, of the cavity. Valve piston 96 includes a valve plug 102. Spring 100 moves ball 98 against its seat 101 and this in turn imposes a force on valve piston 96 moving valve plug 102 into contact with valve seat 94. Valve piston 96 includes a base end 104 which includes a circumferential groove in which a seal ring 106 is received. A pressure passageway 108 enters valve OOV on the large diameter side of valve seat 94. A return passageway 110 leads from valve OOV, on the small diameter side of valve seat 94. When valve plug 102 is seated against valve seat 94, flow through valve OOV from passageway 108 to passageway 110 is prevented.

On/off valve OOV includes a control cam 112 to which a control handle 114 is connected. Control cam 112 is circular in cross section except at the location of an indent 116. Indent 116 includes a flat chord surface. On/off valve OOV also includes a control rod 118 having a cam end portion which extends through an opening 120 formed in a divider wall 122. Divider wall 122 is located between the valve piston cavity and the control cam cavity. The opposite end of rod 118 includes a circular head 124 that is located in the intermediate diameter section of the valve piston cavity. This is shown in FIGS. 4 and 5. When on/off valve OOV is in its "on" position (FIG. 4), the cam end portion of control rod 118 is in contact with the base surface of indent 116. Pressure fluid entering the cavity 92 through passageway 108 is connected by a port 126 with the region behind the piston base 104. The fluid pressure and the spring 100 both exert a force on the valve piston 96 which moves valve plug 102 against valve seat 94. Control rod 118, when in the position shown by FIG. 4, cannot prevent the described seating movement of valve plug 102. Thus, there can be no fluid pressure movement through the valve OOV. Pressure in passageway 108 is maintained.

Movement of the control handle 114 into the "off" position, shown by FIG. 5, moves a circular surface portion of the cam 112 against the cam end portion of the control rod 118. This acts to move the control rod 118 axially from the position shown by FIG. 4 to the position shown by FIG. 5. The head 124 is moved against the ball 98. This moves ball 98 away from its valve seat 101 and communicates the rear portion of cavity 90 with return passageway 110. The fluid pressure entering passage 108 imposes a force on the front side of the piston base 104 which shifts the valve piston 96 to the right (as pictured in FIG. 5), moving valve plug 102 away from valve seat 94. This opens the main valve orifice and allows fluid pressure to move from passageway 108 to return passageway 110. The removal of pressure from passageway 108 serves to short circuit the main switching valve SV and causes the control system to stop operation even though the pump P is still operating. Thus, when on/off valve OOV is in its "on" position, the valve is shut and hydraulic pressure movement through the valve OOV is prevented. When valve OOV is in its "off" position, the valve is open and fluid pressure flow through the valve is permitted.

The illustrated embodiment of pilot valve PV will now be described, with reference to FIGS. 6 and 7 of the drawing. Pilot valve PV includes a housing H in which an elongated valve plug cavity 128 is formed. An elongated valve spool 130 is located within the cavity 128. In use it occupies one or the other of two positions. The first position is shown by FIG. 6 and the second position is shown by FIG. 7. Valve spool 130 includes spaced apart lands 132, 134, 136, 138. A groove 140 is located endwise outwardly of land 132. A groove 142 is located endwise outwardly of land 138. A groove 144 is defined between lands 132, 134. A groove 146 is defined between lands 136, 138. Valve spool 130 includes opposite end surfaces 148, 150 which perform a function in the operation of the pilot valve PV. Pilot valve PV includes a return passageway 152, two pilot passageways 154, 156, and two control passageways 158, 160. Control passageways 156, 158 are interconnected by a passageway 162 which includes a restrictions 164, 165, the purpose of which will be hereinafter described.

The valve spool 130 is shifted between its two positions by creating a pressure differential between its two ends 148, 150. When the pressure acting on surface 150 is greater than the pressure acting on surface 148, valve spool 130 will be moved into the position shown by FIG. 6. When the pressure acting on surface 148 is larger than the pressure acting on surface 150, the valve spool 130 will be moved into the position shown by FIG. 7. When valve spool 130 is in the position shown by FIG. 6, control passageway 160 is connected to pilot passageway 156 via groove 142 and pilot passageway 154 is connected to return passageway 152 via groove 144. When valve spool 130 is in the position shown by FIG. 7, control passageway 158 is connected to pilot passageway 154, via groove 140 and pilot passageway 156 is connected to return passageway 152 via groove 146.

The two pilot controlled check valves PC1, PC2 will now be described. Essentially the two valves PC1, PC2 are identical but each will be separately described, owing to the fact that each valve PC1, PC2 is connected to different passageways. Referring first to FIGS. 8 and 9, valve PC1 is shown to comprise a housing H in which a valve cavity 166 is formed. A valve plug 168 is located in cavity 166. A compression spring 170 normally biases valve plug 168 into the position shown by FIG. 9. Valve plug 168 includes an end surface 172 which contacts a valve seat when the valve is closed (FIG. 9). Valve plug 168 also includes an annular surface 174 which is in communication with the fluid pressure in passageway 176 when the valve is closed. End surface 172 is in communication with the fluid pressure in passageway 178 when the valve is in its closed position. The spring chamber region behind the valve plug 168 is in communication with the fluid pressure in a pilot passageway 86. When pilot passageway 86 is connected to return, the valve PC1 acts as a check valve and can be opened by line pressure coming from either passageway 176 or passageway 178. However, when fluid pressure is in pilot line 86, the valve plug 168 will be held in a closed position. That is, the pilot valve PC1 will be locked into a closed position and cannot be opened by fluid pressure in either passageway 176 or passageway 178.

Figure 11:
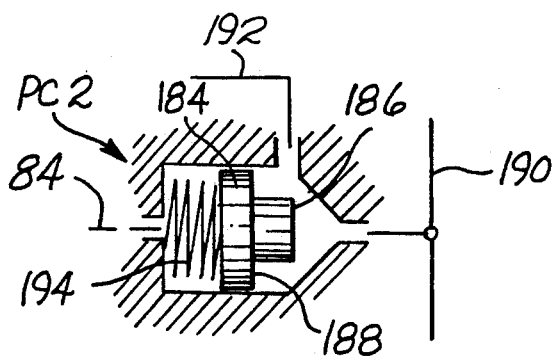
FIG. 11 is a view like FIG. 10, but showing the valve in an open position.

Referring to FIGS. 10 and 11, pilot valve PC2 includes a cavity 182 and a valve plug 184 in the cavity 182. Valve plug 184 includes an end surface 186 and an annular surface 188. End surface 186 is in communication with pressure in passageway 190. Annular surface 188 is in communication with pressure in passageway 192. Valve plug 184 is backed by a compression spring 194 which normally biases the valve plug 184 into a closed position (FIG. 10). As in the case of pilot valve PC1, PC2 can be opened by pressure in either passageway 190 or passageway 192 provided that the pilot passageway 84 is connected to return. If pilot passageway 196 is connected to pressure, the valve plug 184 will be held into a closed position.

Switching valve SV will now be described, with reference to FIGS. 12 and 13. Valve SV includes a housing H in which an elongated cavity 198 is formed. Cavity 198 is divided into a series of cavity regions or chambers. These include a first pilot chamber 200, a first return chamber 202, a first transmit chamber 204, a pressure chamber 206, a second transmit chamber 208, a second return chamber 210 and a second pilot chamber 212. Pilot passageway 154 connects to pilot chamber 200 and pilot passageway 156 connects to pilot chamber 212. Pressure passageway 214 connects to pressure chamber 206. Return passageway 216 connects to both of the return chambers 202, 210. Transmit chamber 204 connects to passageway 178 and transmit chamber 208 connects to passageway 190.

Two valve members VM1, VM2 are located in the cavity 198. Valve member VM1 includes a piston P1 which separates pilot chamber 200 from return chamber 202. It also includes a first valve plug 217 located within return chamber 204. Valve plug 216 includes a conical valve surface 218 which confronts and sometimes contacts a valve seat 220. Valve seat 220 is an edge of a valve orifice 222. Valve member VM1 includes a second valve plug 224. Valve plug 224 includes a conical valve surface 226 which confronts and sometimes contacts a valve seat 228. Valve seat 228 is an edge portion of a valve orifice 230 (FIG. 13). Valve plugs 217, 224 are connected together by a rod 232. Valve plug 217 and piston P1 are connected together by a rod 234. A cylindrical member 236 leads valve plug 217 into orifice 222. In similar fashion, a cylindrical portion 238 leads valve plug 224 into orifice 230. The purpose of portions 236, 238 is stated in the description of the valve operation.

Valve member VM2 is identical to valve member VM1 except for its orientation. Valve member VM2 includes a valve plug 240 that is located within return chamber 210. Valve plug 240 includes a valve surface 242 which confronts and sometimes contacts a valve seat 244. Valve seat 244 is an edge portion of a valve orifice 246. Valve member VM2 includes a second valve plug 248. It includes a conical valve surface 250 that confronts and sometimes contacts a valve seat 252. Valve seat 252 is an edge portion of a valve orifice 254. Valve plugs 240, 248 are interconnected by a rod 256. Valve plug 240 and piston P2 are interconnected by a rod 258. Valve plug 248 includes a cylindrical portion 260 which leads valve plug 248 into the valve orifice 254. In similar fashion, valve plug 240 includes a cylindrical portion 262 which leads valve plug 240 into orifice 246. The purpose of cylindrical portions 260, 262 will be hereinafter described as a part of the description of switching valve SV.

As illustrated, the inner end portions of valve members VM1, VM2 are located within the pressure chamber 206. Each member VM1 has an inner end area that is exposed to the fluid pressure in chamber 206. The outer ends of valve members VM1, VM2 are the ends of pistons P1, P2 which are exposed to pilot chambers 200, 212. The outer ends of the pistons P1, P2 are larger in area than the inner ends of valve plug members 224, 248. Accordingly, if the pressure acting on the piston area is substantially equal to the pressure in chamber 206, a differential force will be created based on the difference in end area. This force will be exerted on the piston and will push the valve member VM1 inwardly.

FIG. 12 shows a first position of the switching valve SV. FIG. 13 shows the second position of the switching valve SV. In FIG. 12, system pressure is delivered via pilot lines 156 into pilot chamber 212 while pilot chamber 200 is vented to return via pilot line 154. Pressure is delivered by passageway 214 into pressure chamber 206. Pressure exerts an endwise force on the inner ends of the two valve members VM1, VM2. The force exerted on valve member VM1 is not opposed by pressure in pilot chamber 200. As a result, the pressure in chamber 206 moves valve member VM1 endwise outwardly until there is contact between valve surface 226 and valve seat 228, as shown in FIG. 12. The pressure in pressure chamber 206 is exerted on the inner end of valve member VM2. However, the pressure in pilot chamber 212 acting on piston P2 creates a pressure differential acting on valve member VM2 and which push valve member VM2 endwise inwardly until valve surface 242 meets valve seat 244. When valve members VM1, VM2, are in the position shown by FIG. 12, valve orifice 222 is opened, valve orifice 230 is closed, valve orifice 254 is open and valve orifice 246 is closed. Pressure from pressure chamber 206 is connected to passageway 190 via transmit chamber 208. Passageway 178 is connected to return passageway 216 via transmit chamber 204.

When pressure is directed through passageway 154 into pilot chamber 200 while pilot chamber 212 is vented to return by passageway 156, the valve members VM1, VM2 shift into the position shown by FIG. 13. The force acting on the outer end of valve member VM1 is larger than the force acting on the inner end of such member, because of the area difference. The force differential acts to shift valve member VM1 from the position shown in FIG. 12 into the position shown in FIG. 13. The pressure in pressure chamber 206 acting on the inner end of valve member VM2 is unimposed by pressure in pilot chamber 212. Thus, the pressure in chamber 206 acting on the inner end of valve member VM2 shifts valve member VM2 from the position shown by FIG. 12 into the position shown by FIG. 13. This shifting of valve members VM1, VM2 closes valve orifice 222, opens valve orifice 230, closes valve orifice 254 and opens valve orifice 246. Pressure chamber 206 is then connected to passageway 178 via transfer chamber 204. Passageway 190 is connected to return passageway 216 via transfer chamber 208.

Passageway 110 is always connected to return passageway 216 regardless of the position of valve member VM1. See FIGS. 12 and 13.

Referring to FIG. 14, a sequence or limit valve is associated with each port 46, 48, 50, 58, 60, 62. Limit valve LV1 is associated with port 46. Limit valve LV2 is associated with port 48. Limit valve LV3 is associated with port 50. Limit valve LV4 is associated with port 58. Limit valve LV5 is associated with port 60. Limit valve LV6 is associated with port 62. Valves LV1, LV2 and LV3 are identical. Valves LV4, LV5, LV6 are identical. All of the valves LV1, LV2, LV3, LV4, LV5, LV6 can be opened in one direction by line pressure and closed in the opposite direction by line pressure. All valves LV1, LV2, LV3, LV4, LV5, LV6 can be opened by application of a mechanical force. Valves LV1, LV2, LV3 are pushed into an open position. Valves LV4, LV5, LV6 are pulled into an opened position.

The valves LV1, LV2, LV3, LV4, LV5, LV6 will now be described in detail with reference to FIGS. 14–17. FIGS. 15–17 are of motor M2 and valves LV2 and LV5.

Referring to FIG. 14, limit valves LV1, LV2, LV3 include control rods 264, 266, 268. Control rod 264 extends endwise from a valve plug 270. Valve plug 270 is backed by a compression spring 272 which biases valve plug 270 into a closed position. Rod 264 extends endwise from valve plug 270 towards an operator 274 which is carried by the movable portion of motor M1. In the illustrated embodiment, when motor M1 is fully retracted, operator 274 is moved against rod 264 a sufficient amount to move valve plug 270 into an open position, in opposition to the spring 272. In like fashion, rod 266 is confronted by, and operated by an operator 276. Rod 268 is confronted by, and operated by an operator 278. Rod 266 includes a valve plug 280 backed by a spring 282 and rod 268 includes a valve plug 284 backed by a spring 286. Valves LV4, LV5, LV6 close in an opposite direction from valves LV1, LV2, LV3. Valves LV4, LV5, LV6 include guide rods 288, 290, 292 which extend from valve plugs 294, 296, 298, through the valve orifices and through a guide bushing. Control rods 300, 302, 304 extend from the valve plugs 294, 296, 298, towards movable portions 16, 18, 20 of motors M1, M2, M3. Compression springs 306, 308, 310 bias valve plugs 294, 296, 298 into a closed position.

In each of the valves LV1, LV2, LV3, LV4, LV5, LV6, the valve seat is formed in a wall which divides the valve housing into two chambers. Motor ports 46, 48, 50, 58, 60, 62 each connect to a separate chamber of a separate valve LV1, LV2, LV3, LV4, LV5, LV6. As illustrated, a passageway connection is made to each chamber. Control rods 300, 302, 304 extend through openings 312, 314, 316 in operators 318, 320, 322. Control rods 300, 302, 304 include heads 324, 326, 328 which are located on the side of operators 318, 320, 322 opposite the valve plugs 294, 296, 298. As stated above, the springs 306, 308, 310 normally bias the valve plugs 294, 296, 298 into a closed position. During extension of the motors M1, M2, M3, the operators 318, 320, 322 first contact and then move the heads 324, 326, 328. The movement is in opposition to the spring forces of springs 306, 308, 310 and is an amount sufficient to unseat the valve plugs 294, 296, 298.

To summarize the above, retraction of the motors M1, M2, M3 moves the operators 274, 276, 278 against the rods 264, 266, 268, and moves such rods to open the valves LV1, LV2, LV3. At that time the plugs 294, 296, 298 of valves LV4, LV5, LV6 are biased shut by the springs 306, 308, 310, or are opened by line pressure acting on the valve plugs 294, 296, 298, in opposition to the springs 306, 308, 310. Extension of the motors M1, M2, M3 moves the operators 318, 320, 322 against the heads 324, 326, 328 on the control rods 300, 302, 304. This mechanically moves the valve plugs 294, 296, 298 into an open position, in opposition to force of springs 306, 308, 310. At the same time, the valve plugs 270, 280, 284 are biased by the springs 272, 282, 286 into closed positions, or the valves LV1, LV2, LV3 are opened by line pressure acting on the valve plugs 270, 280, 284, in opposition to the springs 272, 282, 286. The control system of the invention functions to connect the ports of the valves LV1, LV2, LV3, LV4, LV5, LV6 to either pressure or return.

The motors M1, M2, M3 are essentially alike. Also, limit valves LV1, LV2, LV3 are essentially alike. Also, limit valves LV4, LV5, LV6 are essentially alike. For that reason, only one motor, one limit valve of the first type and one limit type of the second type will be described in detail. Motor M2 and its limit valves LV2, LV5 have been chosen and are illustrated in FIGS. 15–17. Referring first to FIG. 15, the motor M2 includes a cylindrical body 330 which is closed at one end by a member 332 which includes a head 334 and a neck 336. The head and neck 334, 336 are engaged by shaped cavities in members 338, 339 (FIG. 19). The two members 338, 339 are brought together from opposite sides of member 332, 334 and then are both secured together, such as by bolts 341 (FIGS. 15 and 19). Member 339 includes a connector element for connecting the closed end of cylinder body 18 to whatever it is to reciprocate during operation of the system.

Piston rod 12 includes a main tubular body member 340 which is connected at one end to piston head 24 and at the other end to a spherical ball member 342. An axially elongated cylinder head 344 is connected to the open end of member 330. Cylinder head 344 includes axially spaced apart wear members, seals and dirt guards. The wear members are designated 346. The piston head 24 includes both wear members and seals.

A tube 348 extends through the center of piston rod member 340. The ball end of tube 348 is sealed against leakage at 350. Ball 342 includes the two ports 48, 60. Port 48 extends outwardly from the ball end of tube 348. Port 60 extends outwardly from the ball end of annular passageway 54. The passageway inside of tube 348 is the aforementioned passageway 42.

The ball 342 is clamped between the two parts of a two part housing. The two parts of the housing are secured together by bolts. The bolt holes are designated 356 in FIGS. 15 and 16. As shown in FIG. 15, the ball 342 includes a cylindrical stem portion 358 which is connected to the ball end of tubular member 340. Stem portion 358 extends through a substantially cylindrical opening 360 in the two part housing. Opening 360 is very close in diameter to stem portion 358 and includes a resilient seal ring which surrounds stem 358. The ball end 342 and its socket in the two part housing allows a slight degree of pivotal movement but not to the extent that there is metal-to-metal contact between the housing and stem. Referring to FIG. 16, guide rod 290 is shown to extend through a bushing 362. Control rod 302 extends through a second bushing 364. Bushings 362, 364 are removable and are secured to the housing in any suitable manner. Control rod 302 may be of two part construction connected together by a turn buckle 366, to facilitate installation. Referring to FIG. 17, rod 266 extends through a bushing 368. The spring end of rod 266 extends into a cup 370. Spring end of rod 366 is tubular. Spring 282 extends into this tubular member and at its outer end contacts the endwall of cup 370. Bushing 368 and cup 370 are secured to the housing in any suitable manner.

Referring to FIGS. 18–20, and 29, a beneficial use of the drive system of this invention is to drive the floor slats of a reciprocating floor conveyor As shown by the aforementioned U.S. Pat. Nos. 4,474,285; 4,748,893; 4,793,469; 4,817,783 and 5,000,647, in the past it has been the practice to attach the movable parts of the drive motors to transverse drive beams which in turn are attached to the floor members. The prior art systems utilize relatively heavy components and the thrust lines of the motors are spaced vertically below the floor members. It is beneficial to have the thrust lines of the motors as close to the center of gravity of the floor members as is possible. The system shown by FIG. 18 achieves both of these objectives. The components of the conveyor are relatively lightweight and the thrust lines of the motors are raised and located close to the tops of the floor members FM1, FM2, FM3. The upper members of the ball joint housings are designated 374, 376, 378. The lower housing members are designated 380, 382, 384. The ball at the end of motor M1 is received between housing parts 374, 380. The ball at the end of motor M2 is received between housing parts 376, 382. The ball at the end of motor M3 is received between housing parts 378 and 384. As shown by FIGS. 19 and 20, the upper housing parts 374, 376, 378 are located within floor members FM1, FM2, FM3. Thin sheets of bearing material 386, 388, 390 are secured to housing parts 374, 376, 378. Bearing members 386, 388, 390 are constructed from a self-lubricated plastic of a type which has been used in the past for bearings used between floor members and support beams in reciprocating floor conveyors. See for example, my U.S. Pat. No. 4,785,929, granted Nov. 22, 1988.

Figure 29:
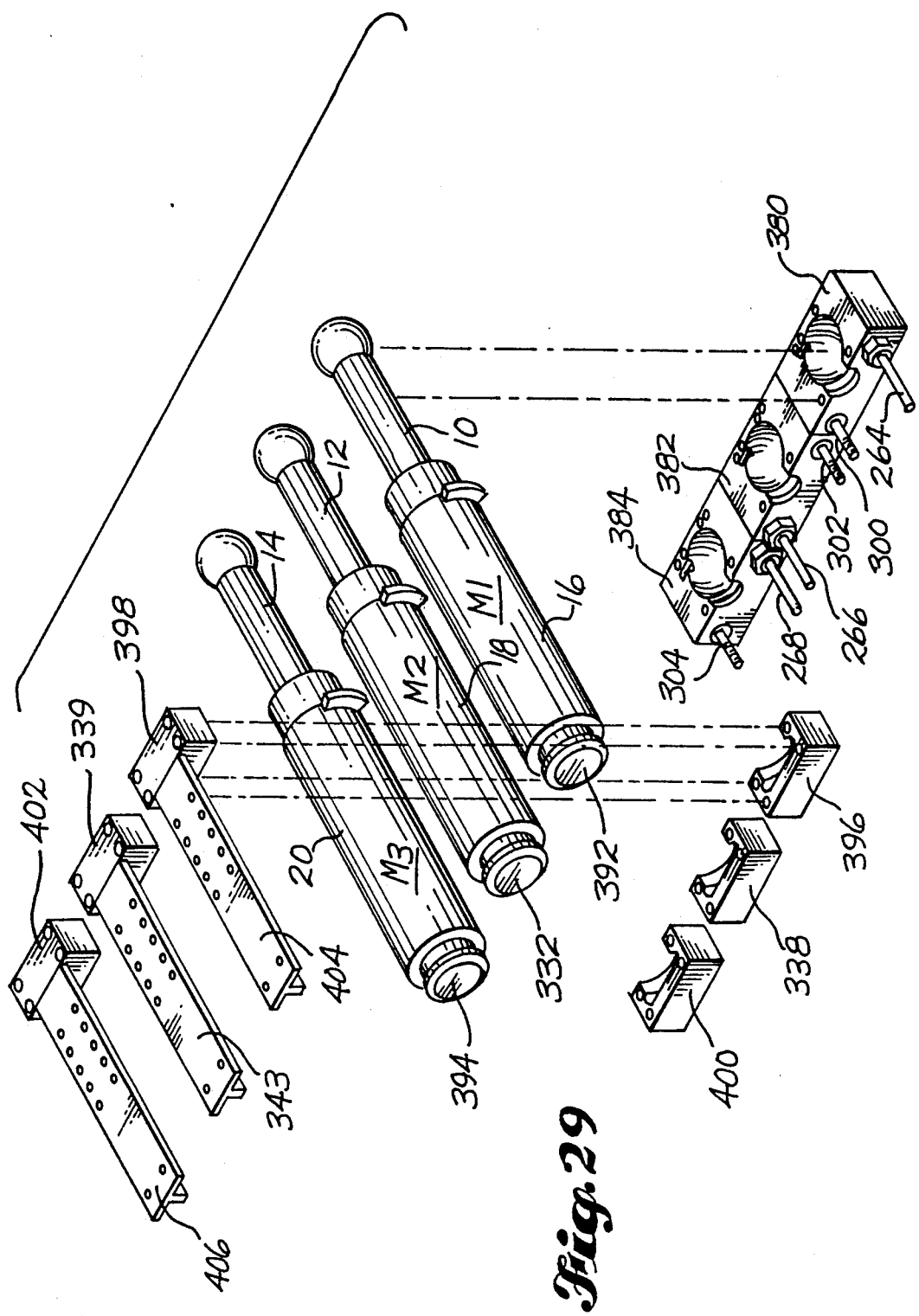
FIG. 29 is an exploded pictorial view of the motors and some associated components, such view showing an embodiment of connectors used to connect the motors to floor members of a reciprocating floor conveyor.

In FIG. 29, motor M1 is shown to have a closed end member 392 which is like the above-described member 332 which is a part of motor M2. Motor M3 includes such end member 394. Motor M1 includes housing parts 396, 398 which are like housing parts 338, 339 (FIG. 19). Motor M3 includes housing parts 400, 402 which are like housing parts 338, 339. Housing parts 396, 338, 400 are identical and housing parts 398, 339, 402 are identical. Each pair of housing parts 396, 398 and 338, 339 and 400, 402 are secured to their associated end member 392, 332, 394 by a system of bolts 341 (FIG. 19) which fit through the bolt holes pictured in FIG. 29. The bolts 341 each extend through a hole in one member and screw into a threaded hole in the second member. Connectors 404, 343, 406 extend axially from the housing parts 398, 339, 402. These connectors 404, 343, 406 are formed integral with or are firmly connected (e.g. welded) to the housing parts 398, 339, 402 so that they are capable of transmitting forces between the motors M1, M2, M3 and the floor members FM1, FM2, FM3. Each connector 404, 343, 406 is positioned up in its floor member FM1, FM2, FM3 and is secured to the floor member by a plurality of bolts. The bolts extend through countersunk holes in the floor members and screw into threaded holes in the connectors 404, 343, 408. Or, they may extend through openings in the connectors 404, 343, 406 and receive nuts at their lower ends. The connectors 404, 343, 406 may have a substantially T-shaped cross section, as illustrated in FIG. 29. As will be apparent, the use of the connectors 404, 343, 406 at the closed ends of the motors M1, M2, M3, and the use of the upper housing parts 374, 376, 378 at the ball ends of the piston rods 10, 12, 14, essentially places the motors M1, M2, M3 upwardly into the floor members FM1, FM2, FM3 (FIG. 19). This places the thrust lines of the motors M1, M2, M3 close to the center of gravity of the floor members FM1, FM2, FM3.

Figure 18:
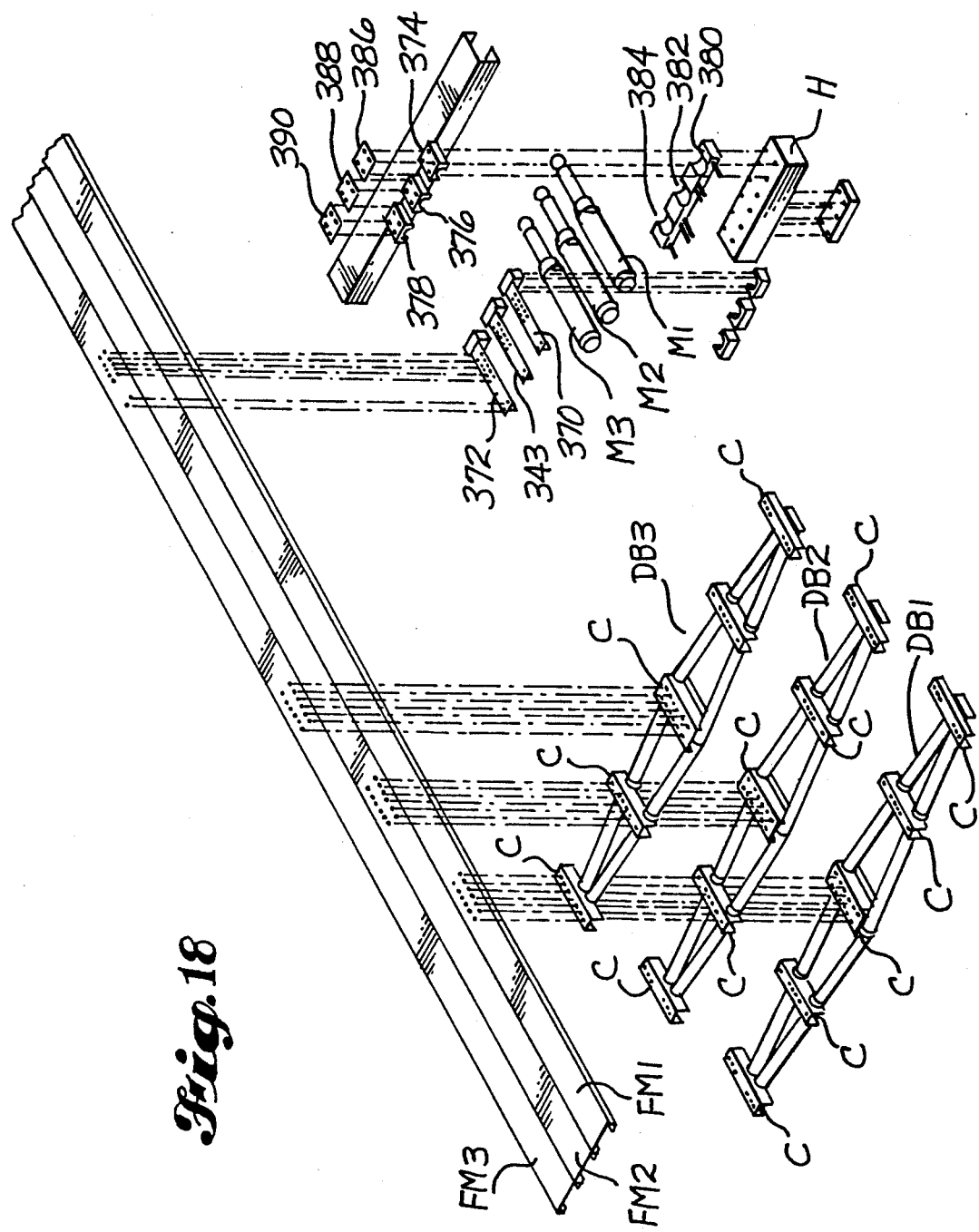
FIG. 18 is an exploded pictorial view of components of a reciprocating floor conveyor.

Referring to FIG. 18, in preferred form, all of the valves OOV, PV, SV, DCV, PC1, PC2 share a common housing H which is located below the housing members 380, 382, 384. A person skilled in the art can easily construct such a housing H or manifold and for that reason it is not necessary to illustrate the housing H in any more detail than has been done. The chamber ports in the chambers of valves LV1, LV2, LV3, LV4, LV5, LV6 communicate with ports in the housing H.

As also shown in FIG. 18, the transverse drive beams DB1, DB2, DB3 are connected to the floor members FM1, FM2, FM3 at a location spaced from the motors M1, M2, M3. Thus, the three floor members FM1, FM2, FM3 to which the motors M1, M2, M3 are directly connected serve as longitudinal drive beams. These longitudinal drive beams transmit the drive forces of the motors M1, M2, M3 to the drive beams DB1, DB2, DB3. The drive beams DB1, DB2, DB3 then transmit the drive forces to the remaining floor members FM1, FM2, FM3. As in prior systems, all of the floor members FM1 are conneoted to drive members DB1. All of the floor members FM2 are connected to drive beam DB2. All of the floor members FM3 are conneoted to drive beam DB3. The difference is there is no direct connection of the motors M1, M2, M3 to the transverse drive beams DB1, DB2, DB3. Rather, the connection is by way of the three floor members FM1, FM2, FM3 which have been chosen to serve as longitudinal drive beams. The transverse drive beams DB1, DB2, DB3 can be spaced apart from each other, each between a transverse frame member which is a part of the conveyor frame. Or, the three drive beams DB1, DB2, DB3 can be positioned relatively close together within a window in the frame, such as disclosed in the aforementioned U.S. Pat. No. 4,793,469, for example.

As shown in FIG. 18, eaoh transverse drive beam DB1, DB2, DB3 includes a plurality of connectors which extend upwardly into the floor members FM1, FM2, FM3. As in prior art systems, countersunk bolts are used to secure the floor members FM1, FM2, FM3 to the connectors C.

The operation of the drive system will now be described with reference to FIGS. 21–28. In these figures, a minimum of reference characters are used. This is because the various components have been described in some detail with reference to FIGS. 1–20 and 29. In FIGS. 1–20 and 29, reference numerals or letters have been used to designate all of the discussed elements.

In FIGS. 21–28 the on/off valve OOV is shown in an "on" position. In FIGS. 21–24 the direction control valve DCV is shown in the position shown by FIG. 2. This position of valve DCV results in the three motors M1, M2, M3 being retracted in unison and extended sequentially. In the conveyor embodiment this results in a load being unloaded towards the rear of the conveyor. The arrow labeled "unload" in FIGS. 21-24 shows the direction of movement of the three motors M1, M2, M3 in unison. In FIGS. 25-28 the direction control valve DCV is shifted into the position shown by FIG. 3. When valve DCV is in the FIG. 3 position, the motors M1, M2, M3 are extended in unison and are retracted sequentially. In FIGS. 21-24 pilot control valve PC1 is locked (FIG. 9) and pilot control valve PC2 is open (FIG. 11). FIGS. 25-28 the pilot controlled valve PC1 is open, in the position shown by FIG. 8. The pilot control valve PC2 is locked, in the position shown by FIG. 10. In FIGS. 21 and 26-28 the pilot valve PV is shifted to the right (as pictured) into the position shown by FIG. 7. In FIGS. 22-25, the pilot valve PV is shifted to the left (as pictured) into the position shown by FIG. 6. In FIGS. 21-24 the two valve members VM1, VM2 of switching valve SV are shifted to the right (as pictured) into the positions shown by FIG. 13. In FIGS. 25-28 the valve members VM1, VM2 are shifted to the left (as pictured) into the position shown by FIG. 12. In FIGS. 21-28 the limit valves LV1, LV2, LV3, LV4, LV5, LV6 are shown in either an open position or in a closed position. The various passageways are labeled either P for "pressure" or R for "return". The system includes passageways 408, 410 which have not been previously described. Passageway 408 extends between the spring chamber of limit valve LV4 and the guide rod chamber of limit valve LV5. Passageway 410 extends between the control rod chamber of limit valve LV2 and the spring chamber of limit valve LV3.

Figure 21:
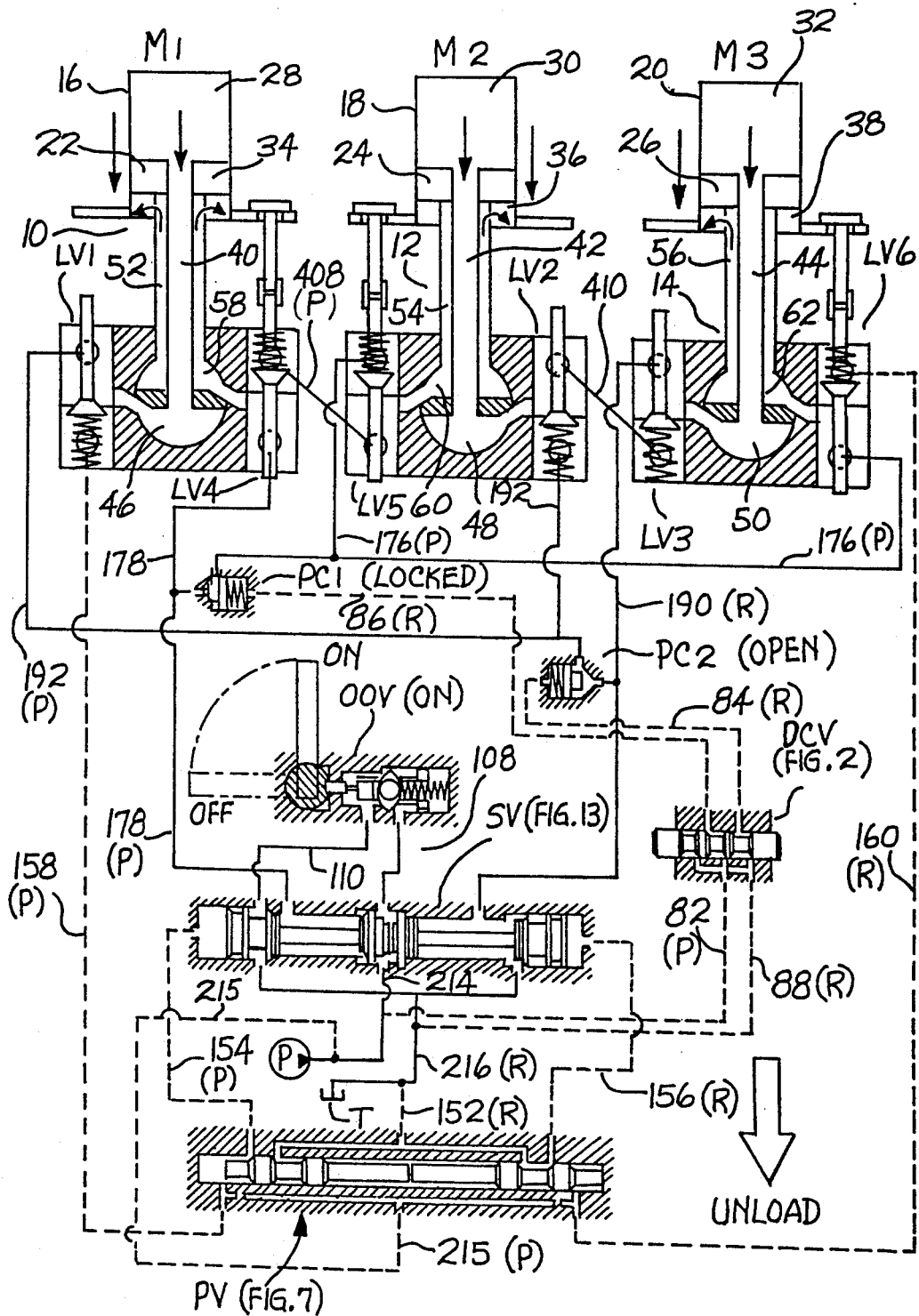
FIG. 21 is a view like FIG. 1, but showing the various valves positioned to cause a simultaneous retraction of the three motors.
Figure 22:
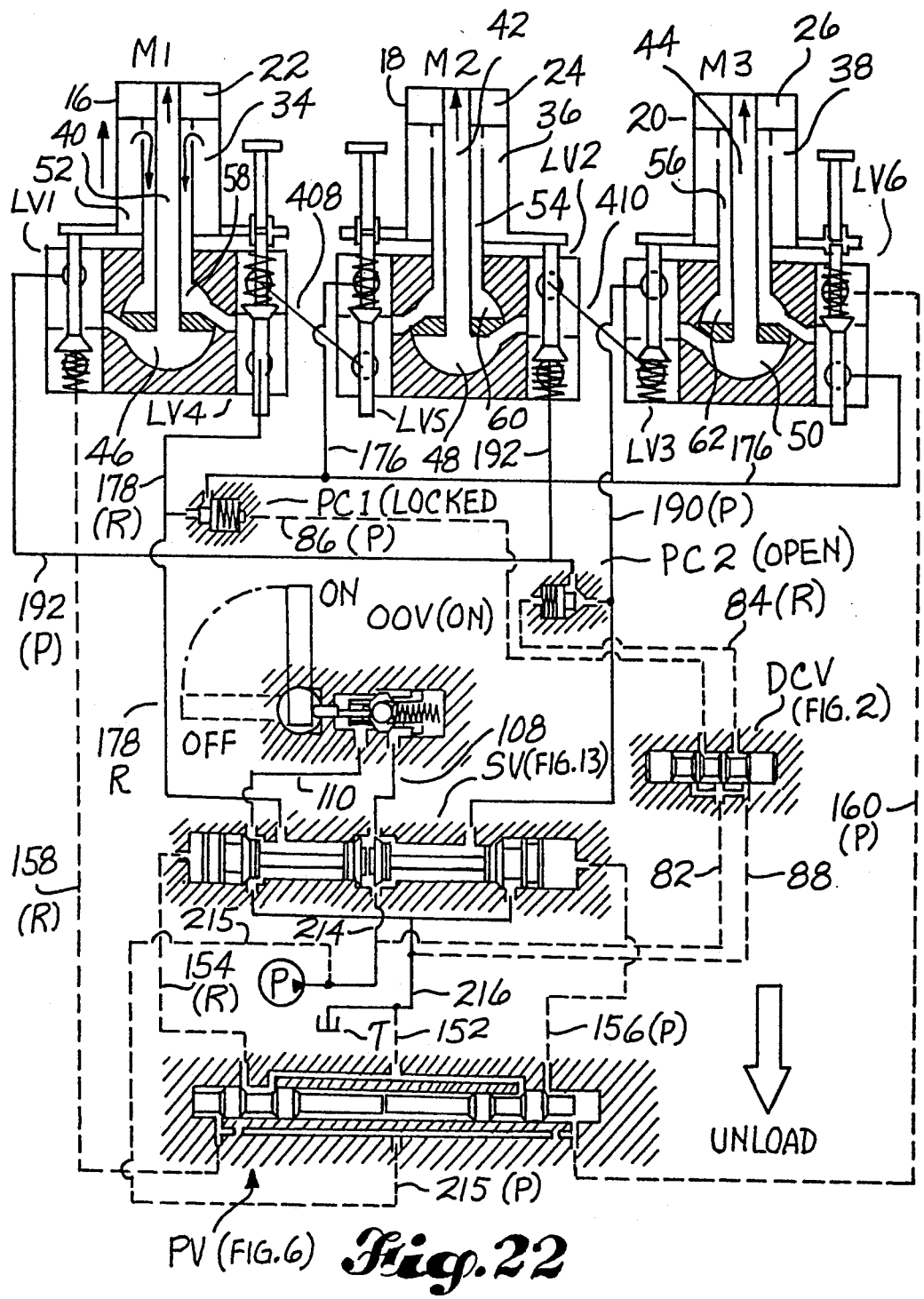
FIG. 22 is a view like FIGS. 1 and 21, but showing the valves positioned to extend motor one while motors two and three are retracted.

FIG. 1 shows all three cylinder bodies 16, 18, 20 fully extended. Limit valves LV4, LV5, LV6 are open. The opening of valve LV6 connects pressure in passageway 176 with passageway 160. This supplies pressure to the right end (as pictured) of pilot valve PV. Release of pressure from pilot chamber 140 to pilot line 158 is blocked by valve LV1. Accordingly, there is no change in the position of the valve spool 130. In FIG. 21 pressure from passageway 178 enters through port 58 and flows through passageway 52 into working chamber 34. The pressure in passageway 178 also moves through limit valve LV4, through passageway 48, into port 60 and then through passageway 54 into working chamber 36. The pressure also moves through limit valve LV5 into line 176 and through line 176 into port 62. There it moves through passageway 56 into working chamber 38. At the same time, all three working chambers 28, 30, 32 are connected to return via conduits 192, 190. Referring now to FIG. 22, when the three cylinder bodies 16, 18, 20 become fully retracted, the limit valves LV1, LV2, LV3 are mechanically opened in the manner previously described. Limit valves LV4, LV5, LV6 are moved into a closed position by their springs. Pressure is now connected via conduits 190, 192 into ports 46, 48, 50. Port 58 is connected to return via conduits 178, 216. As a result, cylinder body 16 is extended. Flow out from working chambers 36 and 38 is blocked by limit valves LV4, LV5. As a result, cylinder bodies 18, 20 do not move.

Figure 23:
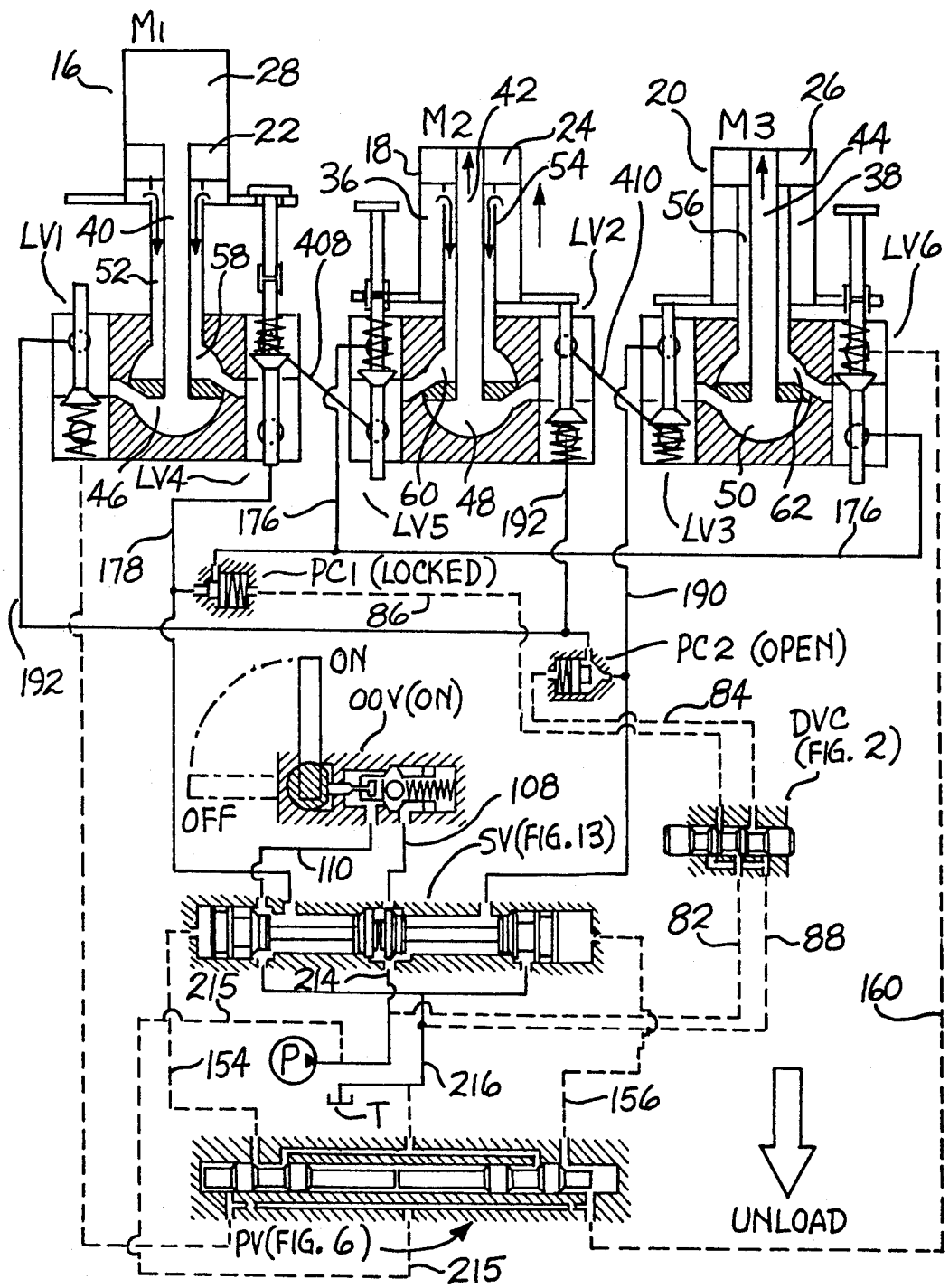
FIG. 23 is a view like FIGS. 1, 21 and 22, but showing the valves positioned to extend motor two while motor one is extended and motor three is retracted.
Figure 24:
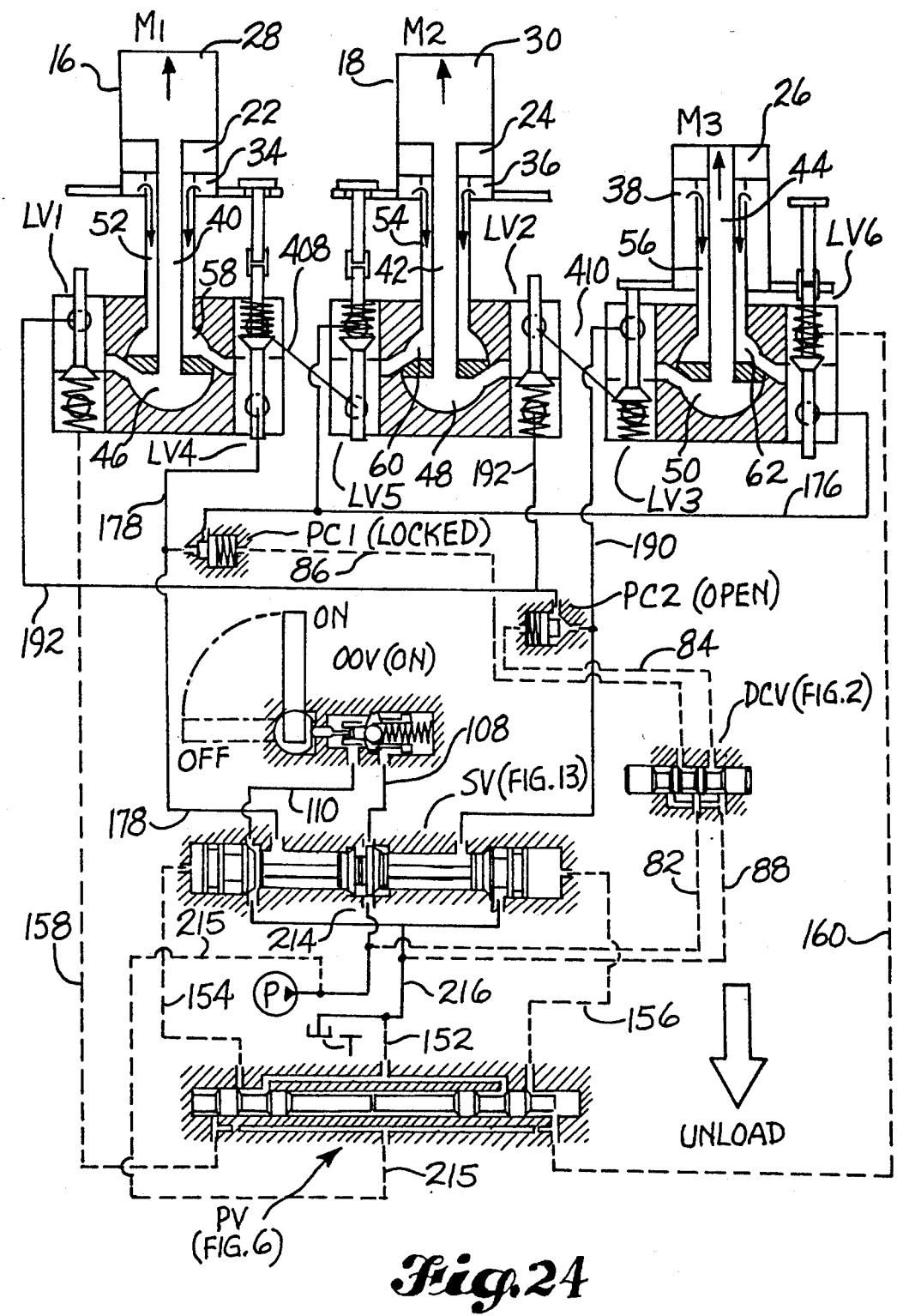
FIG. 24 is a view like FIGS. 1 and 21-23, but showing the valves positioned to extend motor three while motors one and two are extended.

Referring to FIG. 23, when cylinder body 16 becomes fully extended, it mechanically opens limit valve LV4. This allows the escape of pressure from chamber 36, through passageway 54, port 60, passageway 408, to return passageway 178. Pressure movement out from working chamber 38 is still blocked by limit valve LV5. Thus, there is no movement of cylinder body 20. Referring now to FIG. 24, when cylinder body 18 becomes fully extended it opens limit valve LV5. This allows fluid to move from working chamber 38 into passageway 176 and then into the spring chamber of limit valve LV5. It then moves through the valve orifice into passageway 408 and through limit valve LV4 into return passageway 178. Then, the cycle is repeated, provided that there has been no change in the position of direction control valve DCV.

Figure 25:
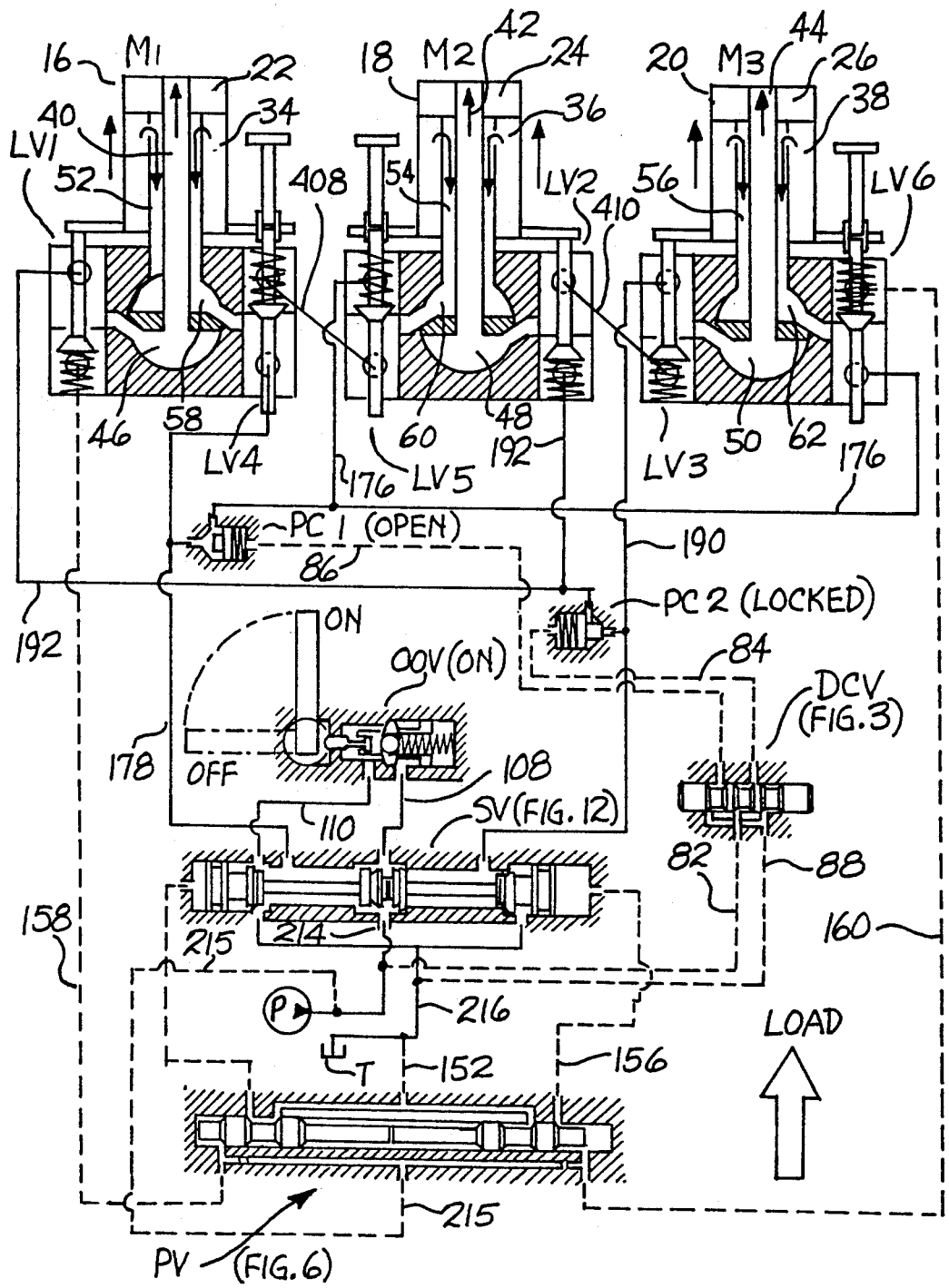
FIG. 25 is a view like FIGS. 1 and 21-24, but showing the valves positioned to extend all three motors.

Referring now to FIG. 25, the direction control valve DCV has been shifted into its position of FIG. 3. In FIG. 25 fluid pressure is shown to be introduced from pressure line 214 through the switching valve SV, into passageway 190, and then port 50, and then passageway 44, and into working chamber 32. Limit valve LV3 is open and pressure from passageway 190 moves through the valve orifice into passageway 410 and then into the control rod chamber of limit valve LV2. It next moves through port 48 into passageway 42 and then into working chamber 30. Limit valve LV2 is open so pressure from passageway 410 moves through the valve orifice into passageway 192 and through passageway 192 into the control rod chamber of limit valve LV1. From there it moves through port 46 into passageway 40 and into working chamber 28. At the same time, passageways 52, 54, 56 are connected to return via passageways 176, 178. Pressure also moves through passageway 158 into pilot chamber 140. However, there is no shifting of the pilot valve spool 130 because flow out from pilot chamber 142 is blocked by limit valve LV6.

Figure 26:
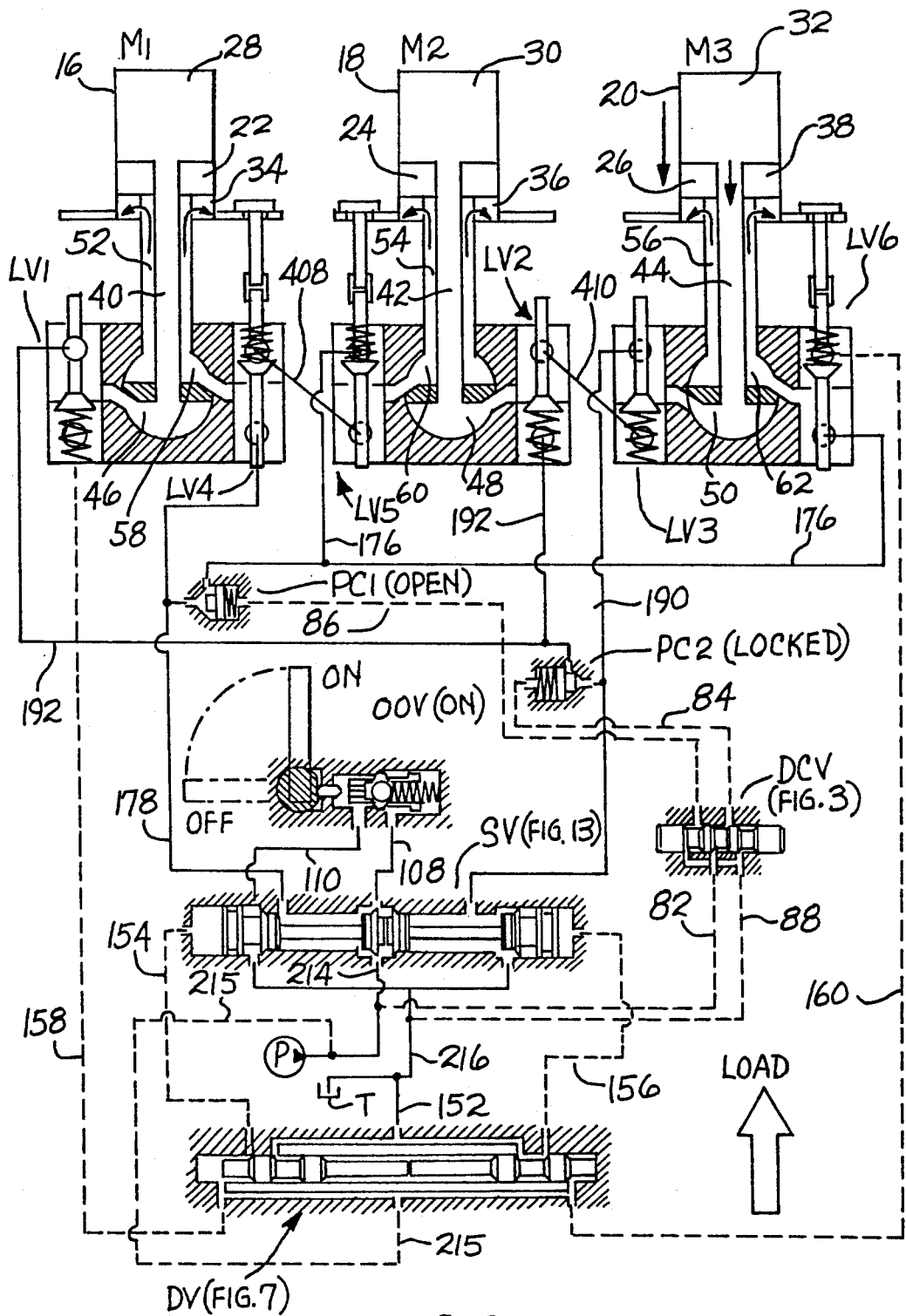
FIG. 26 is a view like FIGS. 1 and 21-25, but showing the valves positioned to retract motor three while motors one and two are extended.

Referring now to FIG. 26, when all three cylinder bodies 16, 18, 20 become fully extended, limit valves LV4, LV5, LV6 become mechanically open. The first thing that happens is that pressure from pilot chamber 142 is released and pilot valve spool 130 is shifted in position to the right, into the position shown by FIG. 7. This causes pressure to be introduced into pilot chamber 200 and released from pilot chamber 212, causing a shifting of the switching valve SV from the position shown by FIG. 12 into the position shown by FIG. 13. Pressure is directed from switching valve SV into passageway 178 and into passageway 176. This pressure moves from passageway 178 through the guide rod chamber of limit valve LV4, into port 58, and then into passageway 52 and onto working chamber 34. Limit valve LV4 is open and thus pressure moves into passageway 408, into the guide rod chamber of limit valve LV5, and from there through port 60 and into passageway 54 and into working chamber 36. Pressure in passageway 178 moves through pilot control valve PC1 into passageway 176. It also moves through limit valve LV5 into passageway 176. From passageway 176 it moves into the guide rod chamber of limit valve LV6. Then it moves through port 62 into passageway 56 and into working chamber 38. Working chamber 32 is conneoted with return line 190 and thus cylinder body 20 is retracted. Flow out from working chamber 30 is blocked by limit valve LV3. Flow out from working chamber 28 is blocked by limit valve LV2. Thus, cylinder body 16, 18 remains stationary while cylinder body 20 is retracted.

Figure 27:
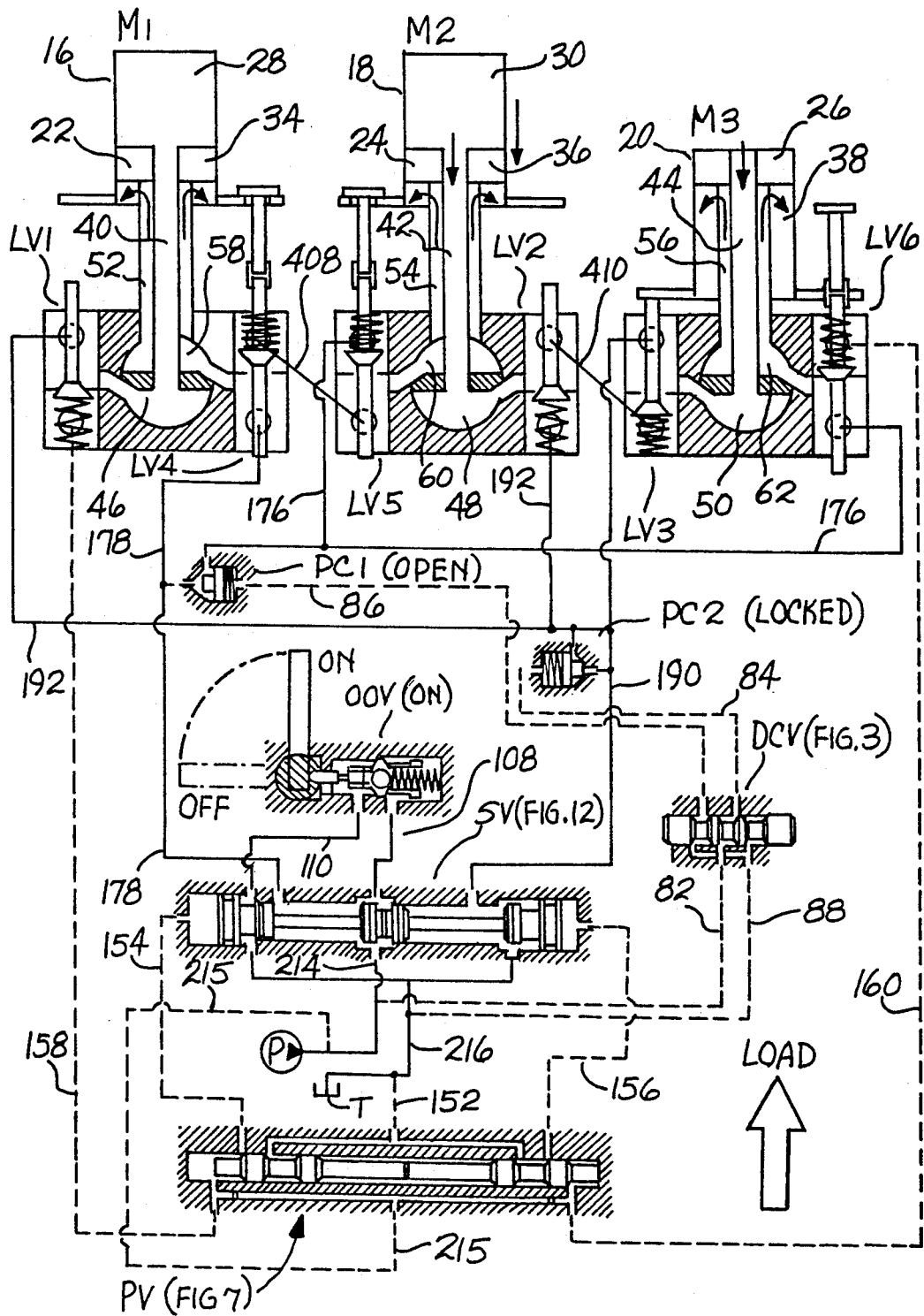
FIG. 27 is a view like FIGS. 1 and 21-26, but showing the valves positioned to retract motor two while motor one is extended and motor three is retracted.

Referring to FIG. 27, when cylinder body 20 is fully retracted, it contacts and opens limit valve LV3. This permits fluid pressure to move from working chamber 30 through passageway 42, port 48, the control rod chamber of limit valve LV2, passageway 410, and the valve orifice of limit valve LV3, into return passageway 190. Flow out from working chamber 28 remains blocked by limit valve LV2. Thus, cylinder body 18 retracts while cylinder body 16 remains stationary.

Figure 28:
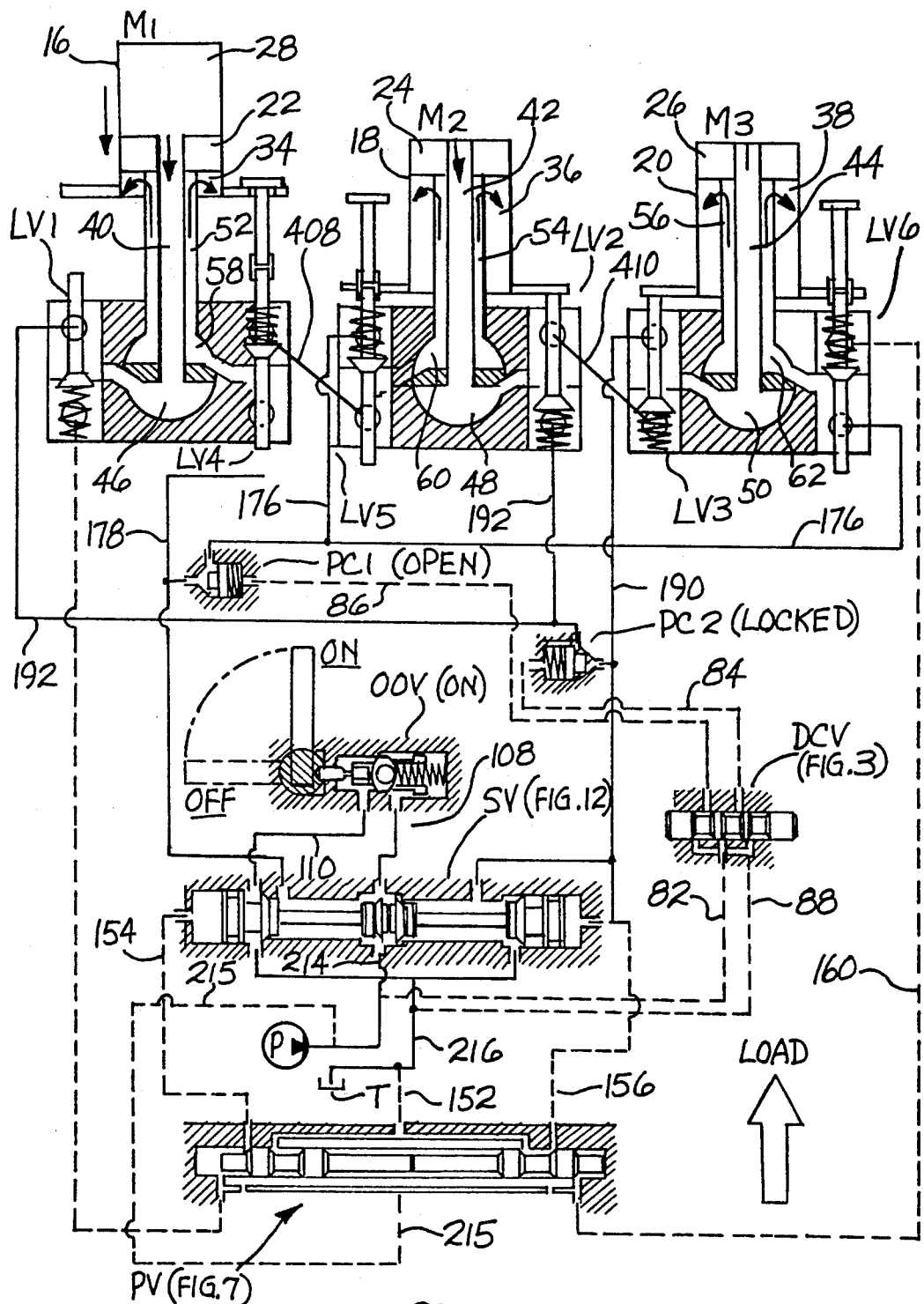
FIG. 28 is a view like FIGS. 1 and 21-27, but showing the valves positioned to retract motor one while motors two and three are retracted.

Referring to FIG. 28, when cylinder body 18 becomes fully retracted, it contacts and opens limit valve LV2. This allows pressure to move from working chamber 28 through passageway 40, through the control rod chamber of limit valve LV1, into passageway 192, and then through the valve orifice of limit valve LV2, into passageway 410, and through the open orifice of limit valve LV3 into return passageway 190. When cylinder body 16 is fully retracted it contacts and opens limit valve LV1. Pressure is now released from pilot chamber 140, resulting in pilot spool 130 shifting to the left (as pictured) into the position shown by FIG. 6. This in turn causes a shifting of switching valve SV to repeat the cycle.

As shown by FIGS. 1, 6, 7 and 21-28, pressure from pump P is communicated with a passageway 162 (FIGS. 6 and 7) in the pilot valve PV via a passageway 215. Referring specifically to FIGS. 6 and 7, the pressure fills passageway 162 and flows through restrictions 164, 165 into passageways 160 and 158, respectively. This arrangement prevents unwanted shifting of pilot spool 130 in response to leakage in the system from one of the passageways 158, 160. However, when one of the passageways 158, 160 is connected to return, by operation of either limit valve LV1 or limit valve LV6, a pressure differential on the pilot spool 130 will be created which shifts it in position. For example, if pilot valve spool 130 is in the position shown by FIG. 6, and passageway 160 is connected to return, pressure will move out from pilot chamber 142 into passageway 160 faster than pressure in passageway 162 can move through orifice 164. Pressure is in passageway 158 and hence in pilot chamber 140 when pilot chamber 142 is connected to return via passageway 160. Thus, a pressure differential is created and the pilot valve spool 130 shifts from the position shown in FIG. 6 into the position shown by FIG. 7. When passageway 158 is connected to return while passageway 160 is connected to pressure, a pressure differential will be created in the opposite direction, moving the pilot valve spool 130 from the position shown by FIG. 7 into the position shown by FIG. 6.

The hydraulic control system of the invention has been illustrated and described in connection with extensible length motors M1, M2, M3. However, it is to be understood that the control system could be used with hydraulic linear motors of the type shown by my above mentioned U.S. Pat. Nos. 4,748,893; 4,793,469; 4,817,783 and 5,000,647. In each of the systems disclosed by these patents each hydraulic linear motor includes first and second working chambers and a passageway for each working chamber. In the system disclosed by U.S. Pat. No. 4,748,893 each working chamber has two parts which are interconnected but the operation is the same. Pressure moves into and out from both parts of each working chamber, i.e. the working chamber parts do not function apart from each other.

Figure 30:
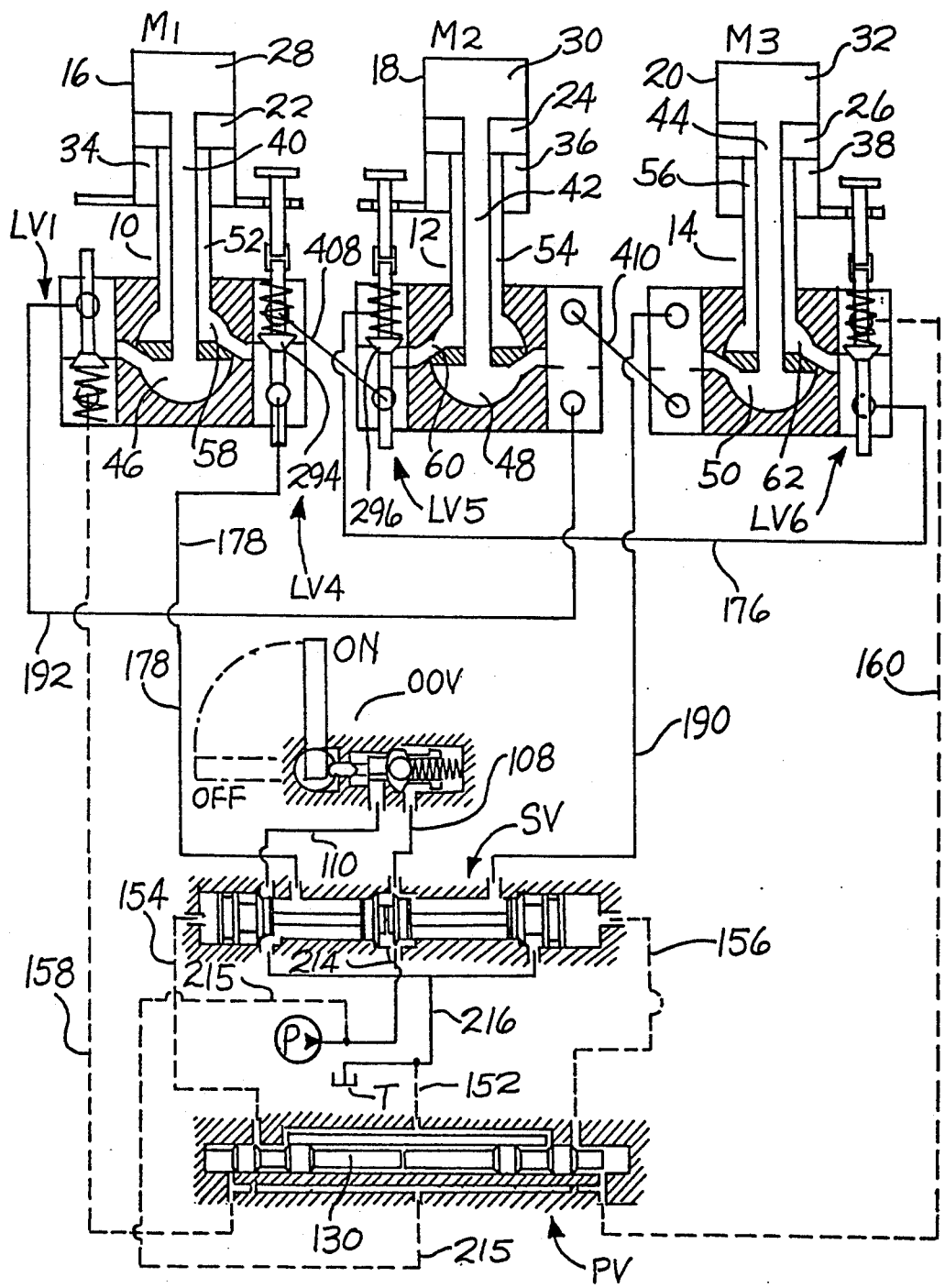
FIG. 30 is a view like FIGS. 1 and 21-28, but of a one way system.

FIG. 30 is a diagram of a one-way drive system. This system is very much like the system shown by FIGS. 1 and 2-28, described above, except that the direction control valve DCV, the two pilot control valves PC1, PC2 and the limit valves LV2, LV3 have been eliminated. When switching valve SV is in the position shown by FIG. 13, pressure is ported through passageway 178 into the guide rod chamber of limit valve LV4 and from such chamber into port 58, passageway 52 and working chamber 34. The pressure acts on valve plug 294, opening valve LV4. The pressure moves through the valve orifice and into passageway 408 and then into port 60, passageway 54 and working chamber 36. The pressure is exerted on valve plug 296, opening valve LV5. The pressure then moves through the valve orifice and into passageway 176, into port 62. It then moves through passageway 56 into working chamber 38. At the same time, port 46 is connected to return via passageway 192, passageway 410 and passageway 190. Port 48 is connected to return via passageway 410 and passageway 190. Port 50 is connected to return via passageway 190. In response, the three cylinder bodies 16, 18, 20 retract in unison. When cylinder body 16 is fully retracted, it contacts the control rod of limit valve LV1 and mechanically opens the valve. This communicates passageway 158 with return via passageways 192, 410, 190 and 216. This connection removes pressure from pilot chamber 140 in pilot valve PV. The opposite end pilot chamber 142 is connected to pressure via limit valve LV6, passageway 160 and passageway 214. The pressure differential shifts the pilot spool 130 into the position shown by FIG. 6. The shifted pilot spool 130 switches pressure and return between passageways 154, 156, causing the valve members VM1, VM2 to move into the position shown by FIG. 12. In this position, pressure from the pump is ported to conduit 190 and into port 50 and passageway 410. From passageway 410 it moves into port 48 and passageway 192. From passageway 192 it moves into port 46. In this manner, fluid pressure is connected to the passageways 44, 42, 40 leading to the working chambers 32, 30, 28, respectively. Working chamber 34 is connected to return via passageways 58, 178 and 216. In response, cylinder barrel 16 extends. Flow out from working chamber 36 must move through passageway 408 and valve LV4 into passageway 178. This movement is prevented by valve LV4 which is urged into a closed position by the pressure attempting to move through passageway 408. In similar fashion, flow out from working chamber 38 must flow through valve LV5. The fluid in 176 acts on valve plug 296 and holds it closed. Thus, cylinder bodies 18, 20 are stationary while cylinder body 16 extends. When cylinder body 16 is fully extended. It opens limit valve LV4. This allows release of pressure from working chamber 36 through passageway 54, port 60, passageway 408, limit valve LV4, passageway 178 and passageway 216. In response, cylinder body 18 extends. Cylinder body 20 remains stationary because limit valve LV5 remains closed. When cylinder body 18 is fully extended, it opens limit valve LV5. This allows movement of pressure from working chamber 38 through passageway 56, port 62, passageway 176, valve LV5, passageway 408, valve LV4, passageway 178 and passageway 216. In response, cylinder body 20 extends. When cylinder body 20 is fully extended, it opens limit valve LV6. This communicates passageway 160 with return and causes a shifting of valve spool 130 followed by a shifting of the valve members VM1, VM2 of switching valve SV. This action starts a new cycle.

The invention is not to be limited by the disclosed embodiment but rather is to be determined by the claims which follow. The claims are to be interpreted in accordance with established rules of patent claim interpretation, including use of the doctrine of equivalents.

What is claimed is:

1. In a hydraulic motor system characterized by three linear hydraulic motors, each having a stationary portion and a movable portion, together defining a first working chamber on a first side of a piston head and a second working chamber on the second side of the piston head, and a control system which moves hydraulic fluid pressure into and out from the working chambers, to move the movable portions of the motors in unison, in a first direction, and to move them sequentially in the opposite direction, said control system including a pilot controlled two position switching valve for switching hydraulic pressure and return between a first passageway leading to the first working chambers and a second passageway leading to the second working chambers, said switching valve including a first end, a second end, a first pilot chamber at said first end, and a second pilot chamber at said second end;

a two position pilot valve for switching hydraulic pressure and return between the first and second pilot chambers of the switching valve, said pilot valve having a first end, a first pilot chamber at said first end, a second end and a second pilot chamber at said second end; and first and second limit valves associated with the linear hydraulic motors, for switching hydraulic pressure and return between the first and second pilot chambers of the pilot valve, said first limit valve being associated with the first linear hydraulic motor to move in sequence, and being mechanically opened when the movable portion of its motor substantially reaches an end-of-movement position, and said second limit valve being associated with the third motor to move in sequence, and being mechanically opened when the third motor substantially reaches an opposite end-of-movement position.

2. A hydraulic motor system according to claim 1, wherein the pilot valve comprises a valve spool having a first end in said first pilot chamber of the pilot valve and a second end in the second pilot chamber of the pilot valve, a first pilot passageway connected at one of its ends to the first pilot chamber of the pilot valve and at its opposite end to said first limit valve, a second pilot passageway connected at one of its ends to the second pilot chamber in the pilot valve and at its opposite end to said second limit valve, a pressure supply passageway interconnecting the two pilot passageways, said pressure supply passageway including a pair of spaced apart restrictions, and a pressure delivery passageway connecting hydraulic pressure to the pressure supply passageway, between the two restrictions, said supply passageway communicating hydraulical pressure with both pilot chambers of the pilot valve, via the two restrictions, wherein the two limit valves are normally closed but one is opened by contact at the end of travel of its motor in one direction, and the other is open by contact at the end of travel of its motor in the opposite direction, and wherein the opening of each said limit valve will connect the associated pilot chamber of the pilot valve with return, and a pressure differential will be created which shifts the valve spool of the pilot valve towards the vented pilot chamber.

3. A hydraulic motor system according to claim 1, wherein said switching valve includes first and second valve members, each having a first end and a second end, with the second ends of the valve members being located in a pressure chamber, and a pressure source passageway delivering pressure into the pressure chamber to act on the second ends of the two valve members; wherein the first end of the first valve member is directed into the first pilot chamber of the switching valve and the first end of the second valve member is directed into the second pilot chamber of the switching valve, wherein the first ends of the valve members are larger in area than the second ends of the valve members, wherein said pilot valve includes passageways leading to the first and second pilot chambers of the switching valve, wherein said pilot valve switches pressure and return between the two pilot chambers of the switching valve, and wherein connection of the first pilot chamber of the switching valve to return results in pressure in the pressure chamber being exerted on the second end of the first valve member, moving such valve member towards the first pilot chamber of the switching valve, and connection of the second pilot chamber of the switching valve to pressure results in a force differential, because of the area difference at the two ends of the second valve member, which shifts the second valve member towards the pressure chamber, with such movement of the two valve members placing the switching valve into one of its positions.

4. A hydraulic motor system according to claim 1, including a direction control valve and pilot controlled check valve means, operable for reversing the linear hydraulic motors so that they move sequentially in the first direction and in unison in the opposite direction.

5. In a hydraulic motor system:

a linear hydraulic motor having a stationary portion and a movable portion, said portions together defining a first working chamber on a first side of a piston head and a second working chamber on a second side of the piston head; said motor further including a first port associated with said first working chamber and a second port associated with said second working chamber;

a first limit valve associated with the first port, said valve comprising a housing divided into first and second chambers by a wall which includes a valve orifice, and said first port of the linear hydraulic motor being connected to the first chamber of said valve; said valve further comprising an inlet/outlet port for the first chamber, an inlet/outlet port for the second chamber, a valve plug in the second chamber, a compression spring biasing the valve plug to close the orifice, and a control rod extending from the valve plug through the first chamber and out from the first chamber towards the movable portion of the motor, said control rod being positioned to be engaged by the movable portion of the motor to push the valve plug away from the orifice against the force of the spring;

a second limit valve associated with the second port of the motor, said second limit valve including a housing divided into first and second chambers by a divider wall which includes a second valve orifice, said second port of the motor being connected to the first chamber of the second limit valve, and said first chamber of the second limit valve including an inlet/outlet port; said second limit valve including a second valve plug in the second chamber of the second limit valve, a second compression spring biasing the second valve plug to close the second orifice, and a second control rod extending from the second valve plug through the second chamber and out from said chamber to the movable portion of the linear hydraulic motor, said second control rod being positioned to be engaged by the movable portion of the motor and pulled into an opened position against the force of said second spring to open said second orifice.

* * * * *

UNITED STATES PATENT AND TRADEMARK OFFICE
CERTIFICATE OF CORRECTION

PATENT NO. : 5,315,916
DATED : May 31, 1994
INVENTOR(S) : Raymond Keith Foster It is certified that error appears in the above-identified patent and that said Letters Patent is hereby corrected as shown below:

Column 2, line 56, after "from", insert -- one --.
Column 3, line 52, "conneoted" should be -- connected --.
Column 4, line 31, "Valve" should be -- valve --.
Column 4, line 43, "and" should be -- an --.
Column 4, line 58, "side-by-side) floor-members" should be
 -- side-by-side floor members) --
Column 6, line 45, "cirouit" should be -- circuit --.
Column 7, lines 10, 15 and 46, "conneoted" should be -- connected --.
Column 8, line 41, "156, 158" should be -- 158, 160 --

Column 8, line 55, "conneoted" should be -- connected --
Column 9, line 11, "conneoted" should be -- connected --.
Column 9, line 31, "196 is conneoted" should be -- 84 is connected --.
Column 9, line 52, "216" should be -- 217 --.
Column 9, line 56, "oonioal" should be -- conical --.
Column 10, line 15, "oylindrical" should be -- cylindrical --.
Column 11, line 10, "conneoted" should be -- connected --.
Column 11, line 56, "eaoh" should be -- each --.
Column 13, line 19, there is a period after "conveyor".
Column 14, lines 39 and 41, "conneoted" should be -- connected --.
Column 15, line 14, insert "In" after "(Fig. 11)."

Column 16, lines 58-59, "conneoted" should be -- connected --.
Column 17, line 29, "conneoted" should be -- connected --.

UNITED STATES PATENT AND TRADEMARK OFFICE
CERTIFICATE OF CORRECTION

PATENT NO. : 5,315,916
DATED : May 31, 1994
INVENTOR(S) : Raymond Keith Foster

It is certified that error appears in the above-identified patent and that said Letters Patent is hereby corrected as shown below:

Column 17, line 62, "eaoh" should be -- each --.
Column 17, line 65, "exoept" should be -- except --.
Column 18, line 12, "46-is conneoted" should be -- 46 is connected --.
Column 18, line 13, there is a comma after "410".
Claim 1, column 19, line 3, "eaoh" should be -- each --.
Claim 1, column 19, line 29, "meohanioally" should be -- mechanically --.

Signed and Sealed this

Tenth Day of October, 1995

Attest:

BRUCE LEHMAN

Attesting Officer

Commissioner of Patents and Trademarks